(12) United States Patent
Ishikawa et al.

(10) Patent No.: US 8,179,752 B2
(45) Date of Patent: May 15, 2012

(54) OPTICAL DISC APPARATUS THEREFOR

(75) Inventors: Yoshinori Ishikawa, Yokohama (JP); Takeshi Shimano, Moriya (JP); Akio Fukushima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 306 days.

(21) Appl. No.: 12/473,752

(22) Filed: May 28, 2009

(65) Prior Publication Data
US 2009/0303847 A1 Dec. 10, 2009

(30) Foreign Application Priority Data
Jun. 10, 2008 (JP) .................................. 2008-151221

(51) Int. Cl.
*G11B 7/00* (2006.01)
(52) U.S. Cl. ..................... 369/44.25; 369/44.27; 369/94
(58) Field of Classification Search ........................ None
See application file for complete search history.

(56) References Cited

U.S. PATENT DOCUMENTS
6,756,574 B2 * 6/2004 Higuchi ..................... 369/44.28

FOREIGN PATENT DOCUMENTS
JP 2003-016660 1/2003

* cited by examiner

*Primary Examiner* — Wayne Young
*Assistant Examiner* — Brian Butcher
(74) *Attorney, Agent, or Firm* — McDermott Will & Emery LLP

(57) ABSTRACT

There is a need to accurately lock focus of a laser beam onto a target data layer of a multilayer optical disc. The above need can be addressed by, for example, performing a focus lock operation after a spherical aberration correction amount is set in such a way as to make smaller the ratio of the focus error signal waveform amplitude at the data layer adjacent to a target data layer through which a laser beam passes earlier than through the target data layer to the focus error signal waveform amplitude at the target data layer than that when the spherical aberration correction amount is set so as to be optimal for the target data layer.

10 Claims, 16 Drawing Sheets

DISC CROSS-SECTION

SUM SIGNAL

DISC CROSS-SECTION

SUM SIGNAL

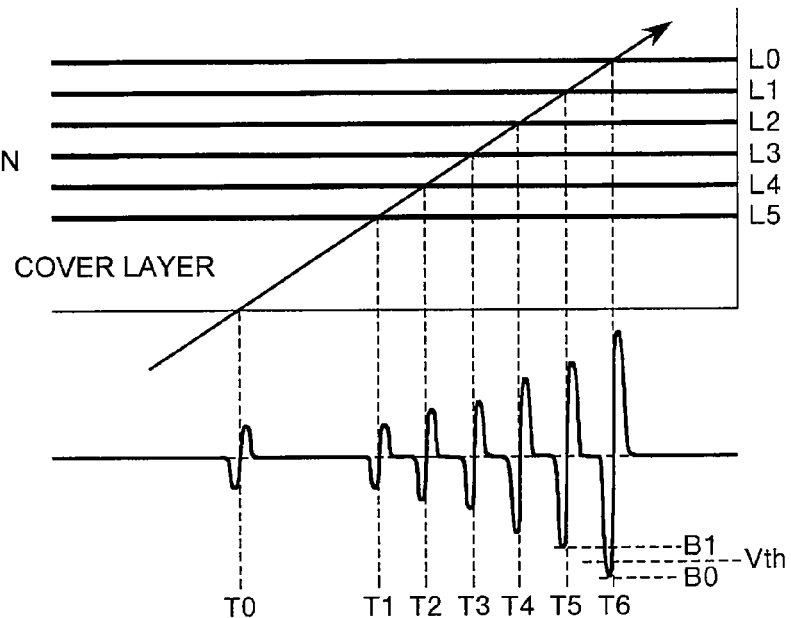
FIG.4A DISC CROSS-SECTION
FIG.4B FE SIGNAL
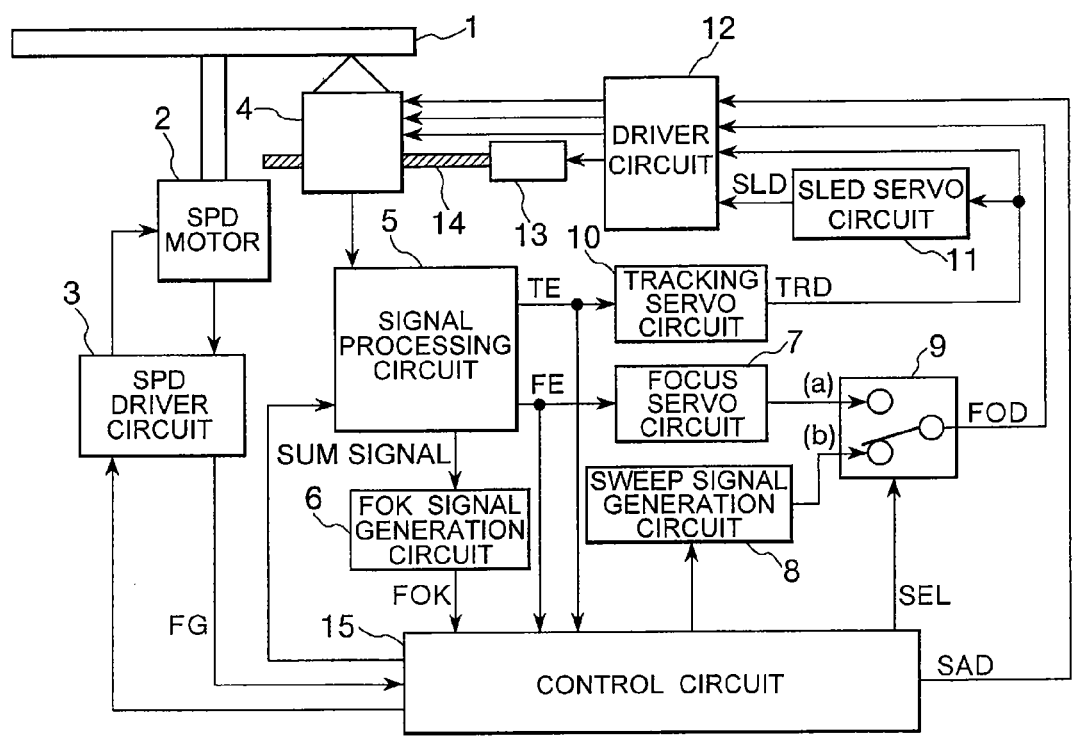
FIG. 5

DISC CROSS-SECTION

FE SIGNAL

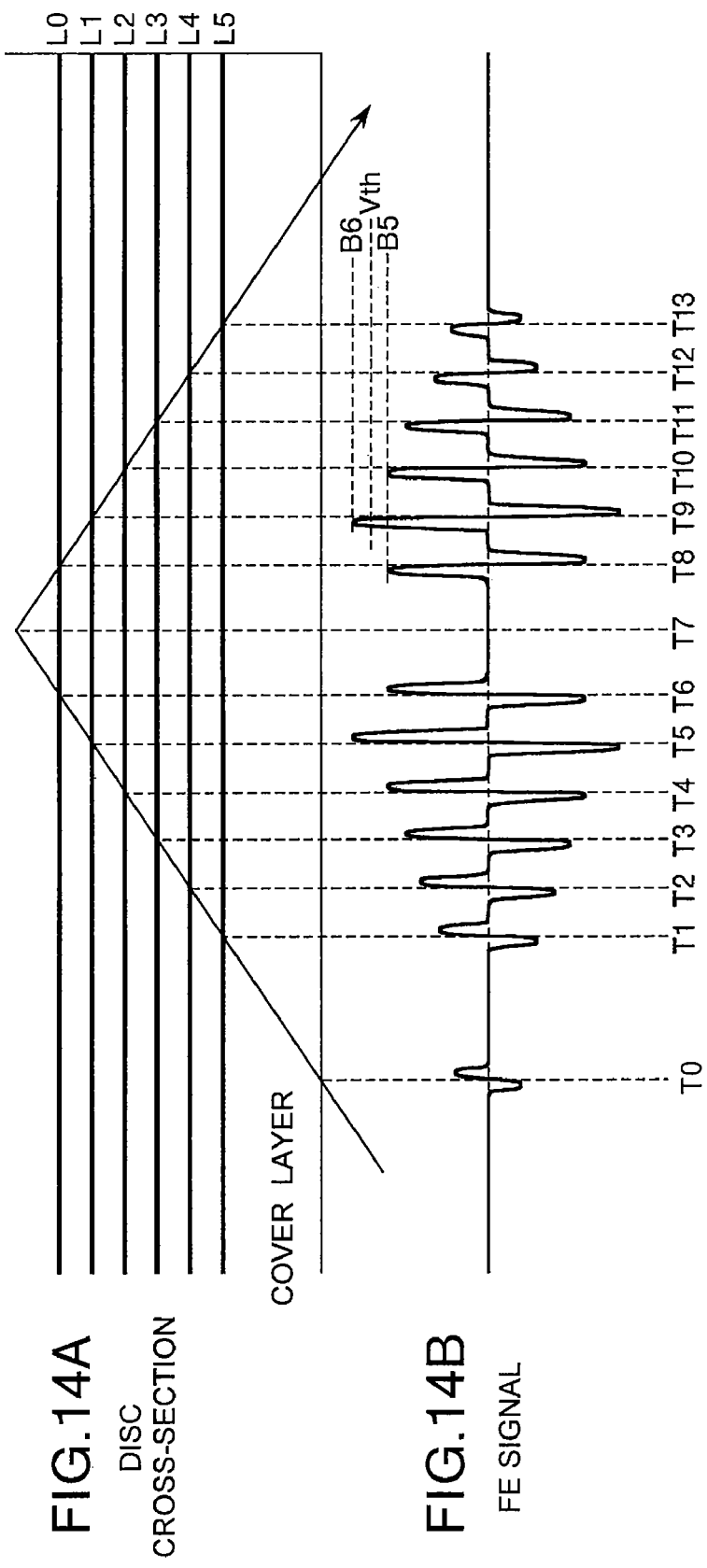

OPTICAL DISC APPARATUS THEREFOR

TECHNICAL FIELD

The present examples relate to a method and optical disc apparatus for locking the focus of a laser beam onto one of the data layers of an optical disc that has two or more data layers.

BACKGROUND

Methods for increasing the storage capacity of an optical disc include, for example, reducing the wavelength of laser light that is used for data write and read, reducing the laser spot size by increasing the numerical aperture of an objective lens, and increasing the number of data layers. Examples of multilayer optical discs include DVDs and Blu-ray discs (hereinafter abbreviated as BDs), in which dual layer structure is now in practical use. In recent years, BDs with three or more data layers have also been proposed.

The optical systems for BDs are configured such that the laser wavelength is 405 nm and the numerical aperture is 0.85, and BDs often suffer the problem of spherical aberration that occurs due to the difference in the distance from the disc cover surface to each data layer. Because the spherical aberration affects the data recording and reproducing capabilities of an optical disc, BD-compatible optical disc apparatuses include spherical aberration correction mechanisms to appropriately correct the spherical aberration, thereby ensuring adequate recording and reproducing capabilities.

In the case of multilayer optical discs, the optimal spherical aberration correction amount differs for each data layer because the distance from the disc cover surface to each data layer differs. This requires optical disc apparatuses to change their spherical aberration correction amount for each data layer so that the amount is optimal for each data layer.

As above, various challenges need to be met by optical disc apparatuses that are compatible with spherical-aberration-prone multilayer optical discs. Another challenge for such optical disc apparatuses is to increase the speed at which the apparatuses lock the focus of a laser beam onto a target data layer with focus servo control. To meet this challenge, Japanese Unexamined Patent Application Publication No. 2003-16660 (Patent Document 1) proposes an optical disc apparatus in which focus lock operation is performed after the spherical aberration correction amount is set in advance so as to be optimal for a desired data layer. Specifically, the spherical aberration correction mechanism is driven before the focus lock operation so as to be optimal for the desired data layer. Thereafter, a so-called focus sweep is performed to bring the objective lens closer to the optical disc, and the number of peaks of a sum signal is counted during this focus sweep. After the desired number is reached, a sum signal level and zero-crossing of a focus error signal are detected to close the focus servo loop.

SUMMARY

In the optical disc apparatus of the above Patent Document 1, a particular data layer is selected by counting the peaks of the sum signal, which is the sum of output signals from a photodetector that detects reflected light from the optical disc. It has turned out, however, that this data layer selection may be difficult in some cases. A new problem recognized by applicants is explained below with reference to FIGS. 1 and 2.

FIG. 1 is an exemplary cross-sectional schematic diagram of a multilayer optical disc, wherein the disc has six data layers.

Reference numeral 100 denotes a cover layer formed from transparent resin or the like. The thickness of the cover layer 100 is for example 50 μm.

Reference numerals 101, 102, 103, 104, 105, and 106 denote data layers L5, L4, L3, L2, L1, and L0, respectively. Each of the data layers has a laminate structure formed of phase-change and organic materials.

Reference numerals from 107 to 111 denote spacer layers each formed from transparent resin. The thickness of each of the spacer layers is for example 10 μm.

Reference numeral 112 denotes a substrate formed of polycarbonate or the like. The thicknesses of all the layers including the cover layer 100 up to the substrate 112 amount to a total optical disc thickness of 1.2 mm. Laser light, used for data write and read, is radiated into the optical disc from the cover-layer-100 side. The layer thickness from the outer surface of the cover layer 100 to the data layer L0 is approximately 100 μm.

Referring now to FIGS. 2A and 2B, a focus lock operation by an optical disc apparatus for the above six-layered optical disc and its associated signal waveform are described. It is assumed in FIGS. 2A and 2B that the spherical aberration correction mechanism of the optical disc apparatus is adjusted in advance so that the spherical aberration correction amount is optimal for the data layer L0. It also is assumed that data layer L0 is a target data layer onto which to focus a laser beam.

FIG. 2A is a cross-sectional diagram of the six-layered optical disc, wherein the arrow in the figure schematically shows a laser path formed by moving the objective lens toward the optical disc upon the focus lock operation. FIG. 2B is a conceptual diagram of a sum signal output by the photodetector. The sum signal has the first peak at time T0 when the laser beam passes through the outer surface of the cover layer. By bringing the objective lens closer to the optical disc, the sum signal reaches the second peak at time T1 when the laser beam passes through the data layer L5. Likewise, the sum signal reaches peaks at times T2, T3, T4, T5, and T6 when the laser beam passes through the data layers L4, L3, L2, L1, and L0, respectively.

A slice level to count the number of the above peaks of the sum signal is also shown in FIG. 2B.

Multilayer optical discs are commonly known to suffer interlayer crosstalk in which reflected lights from data layers interfere with each other, affecting detection signals. Thus, a sum signal may not decrease enough in level while a laser beam travels between two data layers. FIG. 2B shows an example of this, where the sum signal is not low enough in level between the peak at time T1, when a laser beam passes through the data layer L5, and the peak at time T2, when the laser beam passes through the data layer L4. In such cases, the peaks of the sum signal cannot be counted accurately because the sum signal does not become lower than the slice level.

Depending on variations of optical pickup devices, it is also probable that as shown in FIGS. 3A and 3B, the peak level of the sum signal when the laser beam passes through the data layer L5 may not exceed the slice level and that the bottom level when the laser beam travels between the data layers L1 and L0 may not become lower than the slice level. In such cases, it is quite difficult to set a slice level which enables accurate counting of sum-signal peaks.

In the foregoing cases shown in FIGS. 2A, 2B, 3A, and 3B, the optical disc apparatus may miscount the number of the peaks of the sum signal, which results in failure to accurately lock the focus of the laser beam onto a target data layer L0.

Hence, there is a need to provide a method for rapidly locking the focus of a laser beam onto a target data layer of a multilayer optical disc and an optical disc apparatus implementing such an improved focus-locking technique.

The above need can be met by, for example, improving the setup method of the spherical aberration correction amount upon focus lock operation.

In accordance with the present examples, it is possible to provide a method for rapidly locking the focus of a laser beam onto a target data layer of a multilayer optical disc and an optical disc apparatus therefor.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4A and 4B are collectively a schematic diagram of focus-error-signal waveforms when the objective lens is moved closer to the optical disc.

FIG. 5 is a schematic diagram of an optical disc apparatus according to the present teachings.

FIGS. 14A and 14B are collectively a waveform diagram for explaining a third embodiment of a method of locking focus.

DETAILED DESCRIPTION

Figure 1:
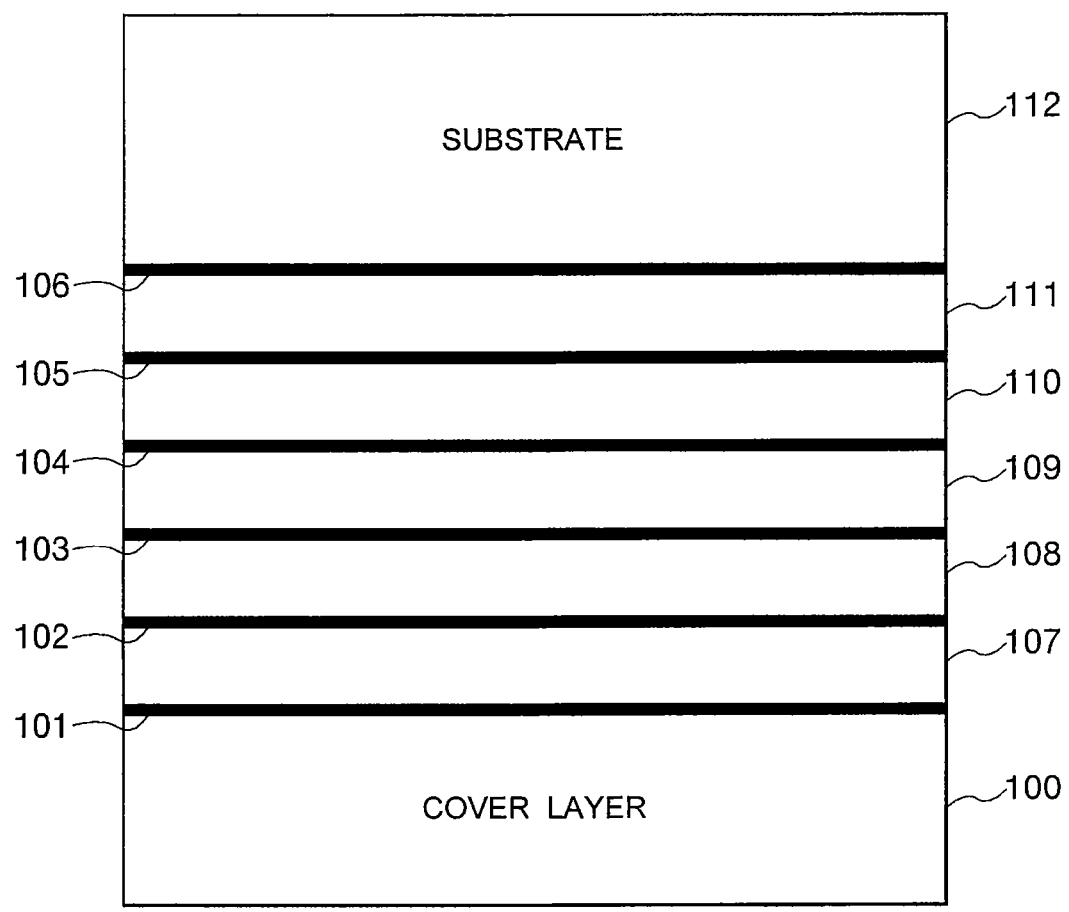
FIG. 1 is a cross-sectional diagram of a six-layered optical disc.
Figure 2A:
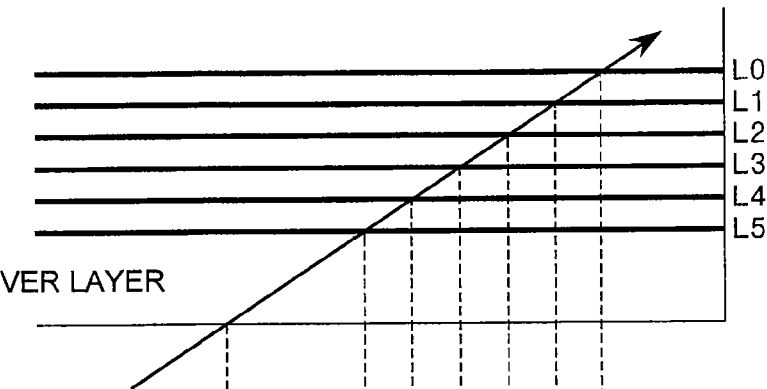
FIGS. 2A and 2B are collectively a schematic diagram of sum-signal waveforms when an objective lens is moved closer to the optical disc.
Figure 2B:
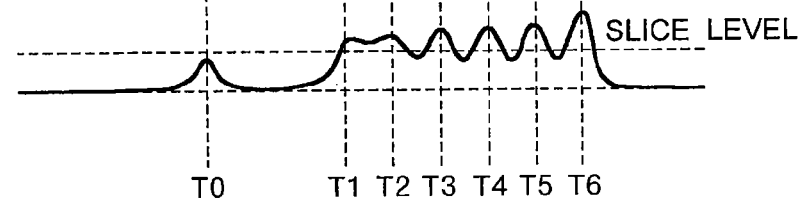
Figure 3A:
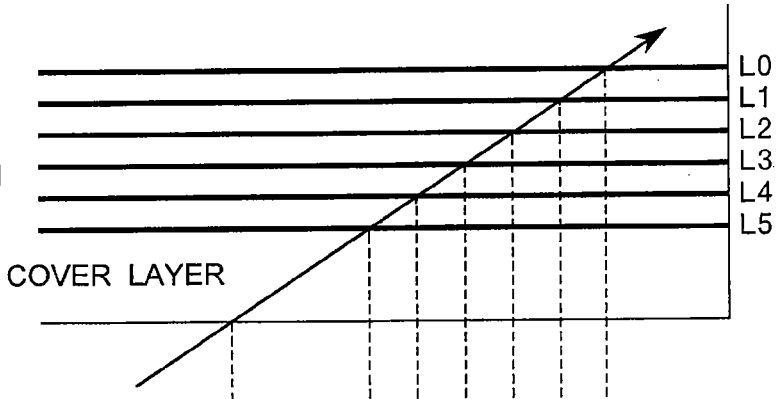
FIGS. 3A and 3B are collectively another schematic diagram of sum-signal waveforms when the objective lens is moved closer to the optical disc.
Figure 3B:
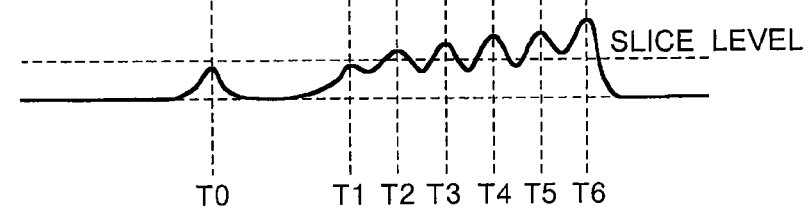

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Examples of the present concepts are hereinafter described in detail.

First Embodiment

It is known that multiple layer optical discs are prone to spherical aberration due to the difference in the distance from the outer surface of the disc cover layer, through which a laser beam is incident for data recording and reproducing, to each data layer. For this reason, the amplitude of an S-shaped waveform of a focus error signal (hereinafter referred to as an FE signal) varies every time the laser beam passes through a data layer. For example, if the spherical aberration correction amount is set so as to be optimal for the data layer L0, the FE-signal amplitude becomes greater when the laser beam passes through the data layer L0 than that when through any other data layers. To put it another way, the FE-signal amplitude is smaller when the laser beam passes through the data layer L1 than that when the laser beam passes through the data layer L0, because the optimal spherical aberration correction amount for the data layer L1 is different from the foregoing optimal amount for the data layer L0. That is, the FE-signal amplitude becomes smaller as a data layer is farther away from the target data layer L0. Note that the word "optimal amount" as used herein refers to the optimal spherical aberration correction amount that generates the greatest FE-signal amplitude when a laser beam passes through a target data layer and not the optimal value for the spherical aberration correction adjustment that is performed after focus lock operation with the use of RF signals and tracking error signals (hereinafter referred to as TE signals).

Described now with reference to FIGS. 4A and 4B are a focus lock operation for a six-layered optical disc according to a first embodiment of the method of locking focus and its associated signal waveforms. It is assumed in FIGS. 4A and 4B that the spherical aberration correction mechanism of the optical disc apparatus according to the first embodiment is adjusted in advance so that the spherical aberration correction amount is optimal for the data layer L0. It also is assumed that data layer L0 is a target data layer onto which to focus a laser beam. The configuration of the optical disc apparatus of the first embodiment will be described later with reference to FIG. 5.

FIG. 4A is a cross-sectional diagram of the six-layered optical disc, wherein the arrow in the figure schematically shows a laser path formed by moving the objective lens toward the optical disc upon the focus lock operation. FIG. 4B is a conceptual diagram of an FE signal. The first zero-crossing S-shaped waveform appears at time T0 when the laser beam passes through the outer surface of the cover layer. By bringing the objective lens closer to the optical disc, the FE signal exhibits the second zero-crossing S-shaped waveform at time T1 when the laser beam passes through the data layer L5. Likewise, the FE signal exhibits zero-crossing S-shaped waveforms at times T2, T3, T4, T5, and T6 when the laser beam passes through the data layers L4, L3, L2, L1, and L0, respectively.

In order to accurately lock the focus of the laser beam onto the target data layer L0, therefore, a detection level Vth is provided, as shown in FIG. 4B, between the bottom level B1 of the S-shaped waveform that appears when the laser beam passes through the data layer L1 and the bottom level B0 of the S-shaped waveform that appears when the laser beam passes through the target data layer L0. By so doing, the focus lock control circuit of the optical disc apparatus can close its focus servo loop at time T6, when the FE signal zero-crosses after becoming lower than the detection level Vth.

The above-described method requires the FE-signal amplitude to be the largest when the laser beam travels through the target data layer L0 onto which to lock the focus of the laser beam. However, even when the spherical aberration correction amount is optimally set for the data layer L0, the FE-signal amplitude may not differ sufficiently between time T5, when the laser beam travels through the data layer L1, and time T6, when the laser beam travels through the data layer L0, in the event that the spacer layer between the data layers L1 and L0 is small in thickness. In this case, it is difficult to set the detection level Vth in such a way as to accurately detect an FE signal when the laser beam travels through the data layer L0. Consequently, the FE signal when the laser beam travels through the data layer L1 may be misdetected as the FE signal that is to be detected when the laser beam travels through the data layer L0. The first embodiment of the method of locking focus, described in detail below, thus overcomes the above problem by enlarging the difference between the FE-signal amplitude when the laser beam travels through the data layer L1 and the FE-signal amplitude when the laser beam travels through the data layer L0 upon focus lock operation.

FIG. 5 schematically illustrates the optical disc apparatus of the first embodiment.

Reference numeral 1 denotes an optical disc, and the disc is, in this case, a six-layered optical disc such as the one shown in FIG. 1.

Reference numeral 2 denotes a spindle motor that pivots to rotate the optical disc 1 in accordance with an output signal from a spindle driver circuit 3. The spindle motor 2 includes a hall sensor therein and outputs a hall sensor signal synchronous with the rotation of the spindle motor 2.

As mentioned above, reference numeral 3 denotes the spindle driver circuit. The spindle driver circuit 3 outputs a signal for rotationally driving the spindle motor 2 in accordance with a spindle drive signal output from a control circuit 15, which will be described later. In accordance with the hall sensor signal output from the spindle motor 2, the spindle driver circuit 3 also outputs a so-called FG signal synchronous with the rotation of the spindle motor 2. The FG signal has multiple pulses that are generated during one rotation of the optical disc 1.

Reference numeral 4 denotes an optical pickup. The optical pickup 4 radiates laser light onto the optical disc 1 for data write and read. The optical pickup 4 also outputs electrical signals in response to reflected lights from the optical disc 1. In addition, the optical pickup 4 includes therein an electrically erasable programmable ROM (hereinafter abbreviated to EEPROM), on which information specific to the optical disc 1 is stored at the time of production. The configuration of the optical pickup 4 will be later described in detail with reference to FIG. 6.

Reference numeral 5 denotes a signal processing circuit. The signal processing circuit 5 performs arithmetic operations on the output signals from the optical pickup 4 to output an FE signal, a TE signal and a sum signal.

Reference numeral 6 denotes an FOK signal generation circuit. The FOK signal generation circuit 6 outputs an FOK signal which results from binarizing the sum signal output from the signal processing circuit 5 at a predetermined level. The FOK signal is sent to the later-described control circuit 15.

Reference numeral 7 denotes a focus servo circuit. The focus servo circuit 7 outputs a signal which is obtained by compensating the FE signal from the signal processing circuit 5 for phase and gain imbalances for the purpose of improving the stability and tracking capabilities of the focus servo.

Reference numeral 8 denotes a sweep signal generation circuit. In response to a command signal from the control circuit 15, the sweep signal generation circuit 8 generates and outputs a sweep signal which serves to cause the objective lens of the optical pickup 4 to move closer to or farther away from the optical disc 1.

Reference numeral 9 denotes a switch circuit. The input terminal (a) of the switch circuit 9 receives the signal output from the focus servo circuit 7 while the input terminal (b) of the switch circuit 9 receives the sweep signal output from the sweep signal generation circuit 8. The switch circuit 9 is activated in response to a control signal SEL which is supplied from the control circuit 15. When the switch circuit 9 receives a low-voltage SEL signal, the input terminal (a) is to be selected. Conversely, when the switch circuit 9 receives a high-voltage SEL signal, the input terminal (b) is to be selected. In addition, the switch circuit 9 outputs a focus drive signal (hereinafter abbreviated to FOD signal).

Reference numeral 10 denotes a tracking servo circuit. The tracking servo circuit 10 outputs a tracking drive signal (hereinafter abbreviated to TRD signal) which is obtained by compensating the TE signal from the signal processing circuit 5 for phase and gain imbalances for the purpose of improving the stability and tracking capabilities of the tracking servo.

Reference numeral 11 denotes a sled servo circuit. The sled servo circuit 11 outputs a sled drive signal (hereinafter abbreviated to SLD signal) which is obtained by extracting the low frequency components of the TRD signal and compensating the extracted components for gain imbalances.

Reference numeral 12 denotes a driver circuit. The driver circuit 12 amplifies the FOD signal and TRD signal and outputs the resultant signals to the focus actuator and tracking actuator, respectively, of the optical pickup 4. The driver circuit 12 also amplifies the SLD signal and outputs the resultant signal to a sled motor 13. Further, the driver circuit 12 amplifies a spherical aberration correction signal SAD output from the control circuit 15 and outputs the resultant signal to the spherical aberration correction actuator inside the optical pickup 4.

Reference numeral 13 denotes, as mentioned above, the sled motor. The sled motor 13 rotates in response to the SLD signal amplified at the driver circuit 12.

Reference numeral 14 denotes a lead screw, one end of which is connected to the sled motor 13. The lead screw 14 is rotationally driven by the sled motor 13. The rotational movement of the lead screw 14 causes the optical pickup 4 to move in radially inward and outward directions of the optical disc 1.

Reference numeral 15 denotes, as mentioned above, the control circuit, which controls the entire operation of the optical disc apparatus. The control circuit 15 inputs thereto the FE signal, TE signal, FOK signal, and FG signal and outputs the spindle drive signal, the command signal for the sweep signal generation circuit 8, the SEL signal for the switch circuit 9, and the spherical aberration correction signal SAD. Also, the control circuit 15 can set gain values for the gain adjusters 504, 508, and 510 of the signal processing circuit 5. In addition, the control circuit 15 has access to the data stored on the EEPROM inside the optical pickup 4 for reading. It should be noted that any commonly used CPU can be adopted as the control circuit 15.

Figure 6:
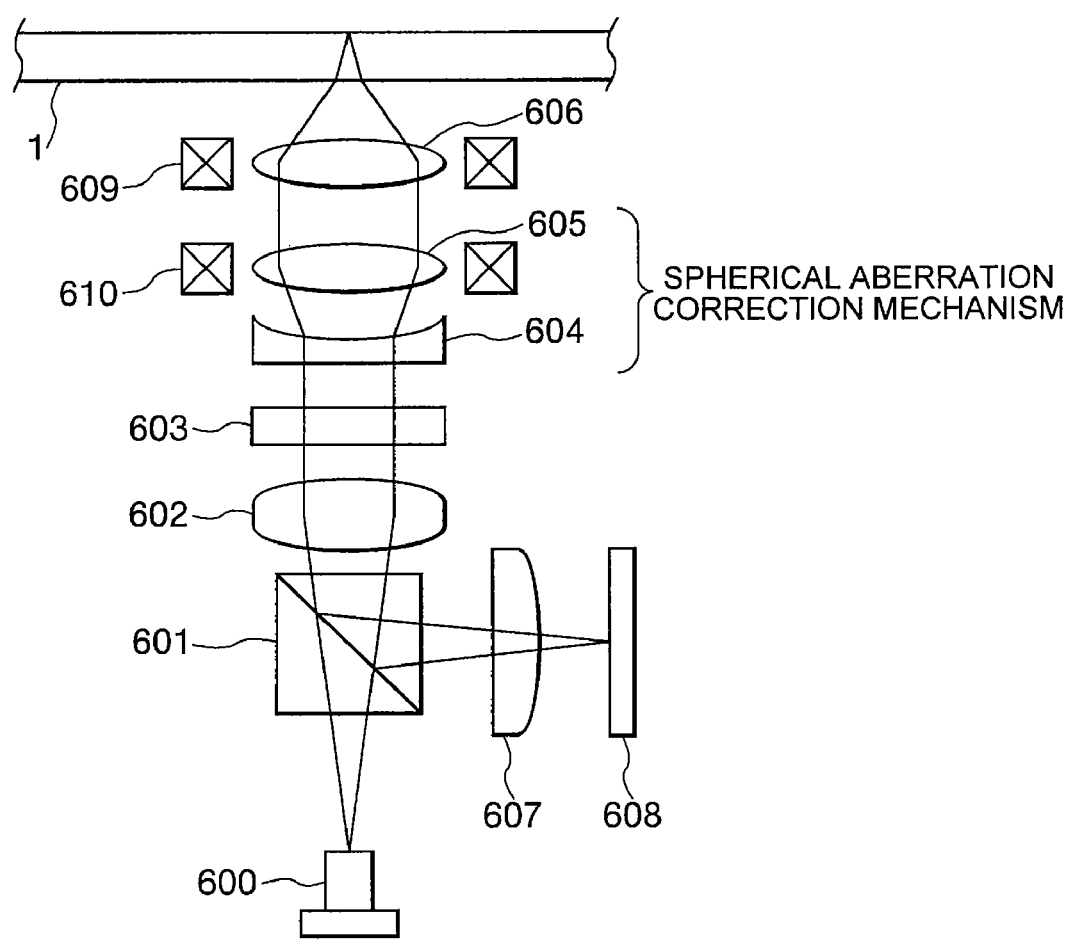
FIG. 6 is a schematic diagram of an optical pickup.

Described next with reference to FIG. 6 is the configuration of the optical pickup 4, or the optical system of the optical disc apparatus according to the first embodiment.

Reference numeral 600 denotes a laser diode that emits laser light.

Reference numeral 601 denotes a polarizing beam splitter that passes the laser light therethrough or reflects it according to its polarization state.

Reference numeral 602 denotes a collimating lens that makes the rays of the laser beam parallel.

Reference numeral 603 denotes a quarter wavelength plate that changes the polarization state of the laser light.

Reference numeral 604 denotes a first correction lens with a concave shape.

Reference numeral 605 denotes a second correction lens with a convex shape.

Reference numeral 606 denotes an objective lens that focuses the laser light onto a data layer of the optical disc 1.

Reference numeral 607 denotes a cylindrical lens.

Reference numeral 608 denotes a four-quadrant photodetector that outputs electrical signals according to the intensity of the laser light incident thereon.

Reference numeral 609 denotes a focus actuator and a tracking actuator. In response to output signals from the driver circuit 12 shown in FIG. 5, these actuators 609 move the objective lens 606 in substantially optical-axis directions of the laser light and in substantially radial directions of the optical disc 1.

Reference numeral 610 denotes a spherical aberration correction actuator. In response to output signals from the driver circuit 12 shown in FIG. 5, the spherical aberration correction actuator 610 moves the second correction lens 605 in optical-axis directions of the laser light.

The above-described first correction lens 604, second correction lens 605, and spherical aberration correction actuator 610 are collectively referred to as a spherical aberration correction mechanism.

While the first embodiment employs such a spherical aberration correction mechanism as described above, the spherical aberration correction mechanism may also include liquid crystal elements or the like.

With the optical pickup 4 configured as above, the laser light emitted from the laser diode 600 travels through the polarizing beam splitter 601, the collimating lens 602, the quarter wavelength plate 603, the first correction lens 604, the second correction lens 605, and the objective lens 606 and incidents into the optical disc 1.

The reflected laser light from the optical disc 1 then travels again through the objective lens 606, the second correction lens 605, the first correction lens 604, the quarter wavelength plate 603, and the collimating lens 602, reaching the polarizing beam splitter 601. Here, the laser light, once in a linearly polarized state when emitted from the laser diode 600, is now in a circularly polarized state because the laser light has passed through the quarter wavelength plate 603 twice. Thus, the laser light is reflected by the polarizing beam splitter 601 and travels through the cylindrical lens 607 onto the four-quadrant photodetector 608.

The configuration of the signal processing circuit 5 is next described with reference to FIG. 7.

The four-quadrant photodetector 608 has four light receiving surfaces A, B, C, and D. The four-quadrant photodetector 608 is arranged such that the boundary between the light receiving surfaces A and D and the light receiving surfaces B and C is in agreement with the track tangential directions of the optical disc 1. The outputs from the light receiving surfaces A, B, C, and D are sent to the signal processing circuit 5 as MA, MB, MC, and MD, respectively. The signal processing circuit 5 calculates a signal (MA+MC)−(MB+MD) with the use of adder circuits 501 and 502 and a subtracter circuit 503, which is a known astigmatic method. The above calculated signal is then subjected to gain adjustment at the gain adjuster 504, and the resultant signal is output as an FE signal. Further, the signal processing circuit 5 calculates a signal (MA+MD)−(MB+MC) with the use of adder circuits 505 and 506 and a subtracter circuit 507, which is a known push-pull method. This calculated signal is then subjected to gain adjustment at the gain adjuster 508, and the resultant signal is output as a TE signal. In addition, the signal processing circuit 5 uses the output signals from the adder circuit 505 and 506 to calculate a signal (MA+MB+MC+MD) at an adder circuit 509. This calculated signal is then subjected to gain adjustment at the gain adjuster 510, and the resultant signal is output as a sum signal. Note that the gain values for the gain adjusters 504, 508, and 510 are controlled by the control circuit 15.

Figure 8:
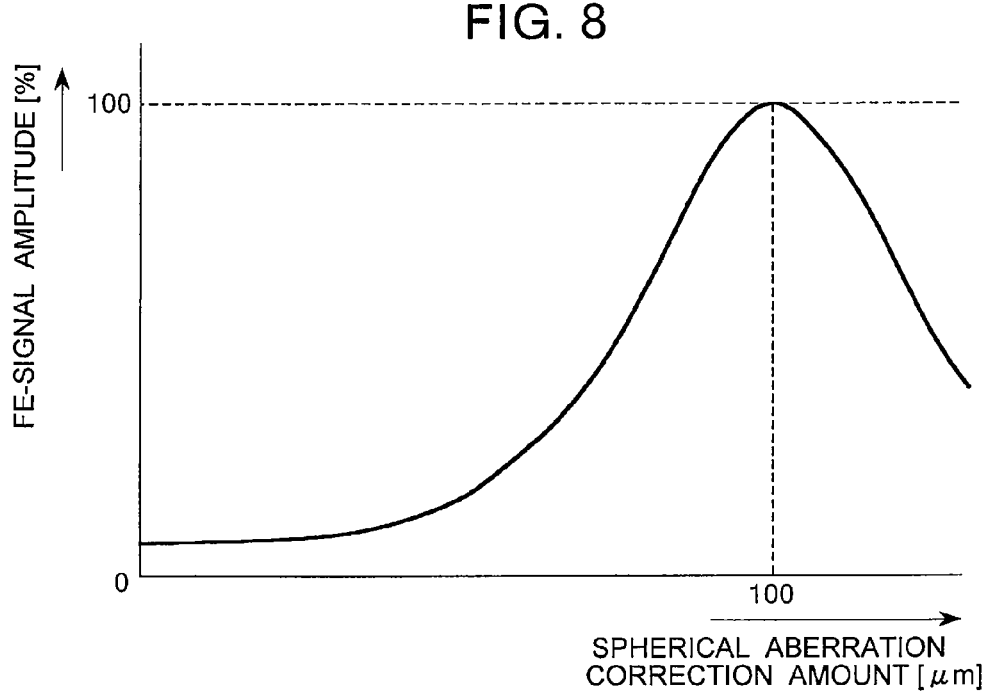
FIG. 8 is a schematic diagram showing the relationship between a spherical aberration correction amount and its associated focus error signal amplitude at a data layer L0.

Referring now to FIG. 8, the relationship between the spherical aberration correction amount for the data layer L0 and its associated FE-signal amplitude is discussed.

The plotted curve of FIG. 8 represents FE-signal amplitudes which are obtained from the data layer L0 while the spherical aberration correction amount is changed. As explained earlier with reference to FIG. 1, the distance from the outer cover-layer surface of the optical disc 1 to the data layer L0 is 100 μm. This means the amplitude of an FE signal at the data layer L0 becomes the largest when the spherical aberration correction amount is 100 μm. It should be noted here that "the 100-μm spherical aberration correction amount" means not that the second correction lens 605 is driven to move by 100 μm, but that the spherical aberration amount is corrected to zero when the distance from the outer cover-layer surface of the optical disc 1 to a target data layer is 100 μm.

It is known that when the spherical aberration correction amount is changed from 100 μm to higher values, the FE-signal amplitude gradually decreases at first, but decreases rapidly thereafter.

Discussed next with reference to FIG. 9, which is similar to FIG. 8, is the relationship between the spherical aberration correction amount and its associated FE-signal amplitude for all the data layers from L0 to L5.

Figure 9:
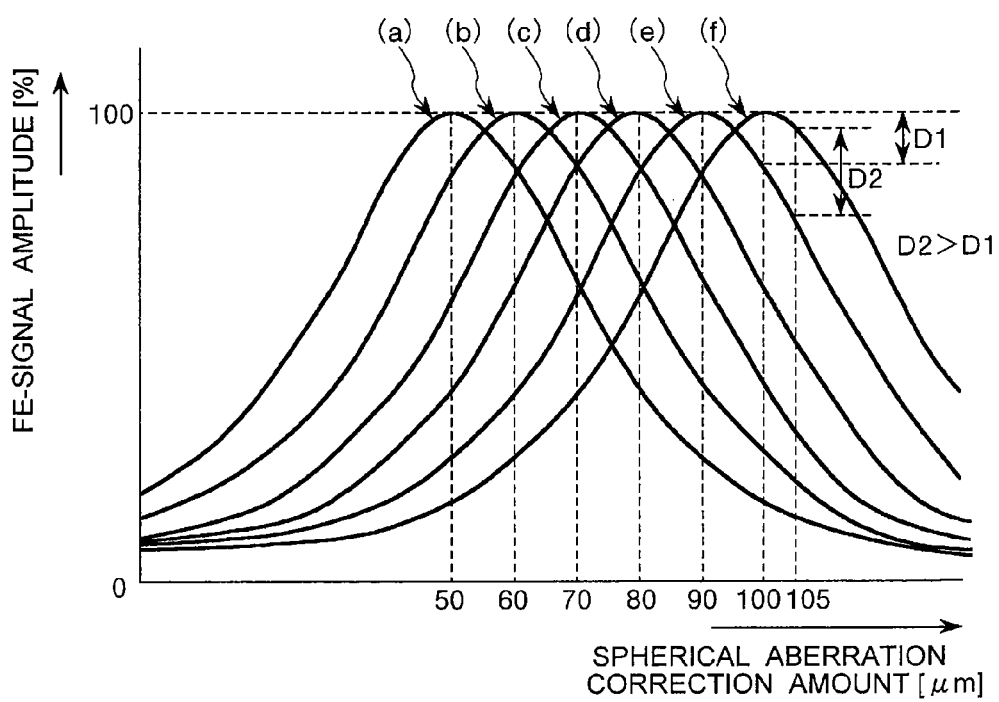
FIG. 9 is a schematic diagram showing the relationship between a spherical aberration correction amount and its associated focus error signal amplitude at each data layer.

The plotted curve (a) of FIG. 9 represents FE-signal amplitudes which are obtained from the data layer L5 while the spherical aberration correction amount for the data layer L5 is changed. Since the distance from the outer cover-layer surface of the optical disc 1 to the data layer L5 is 50 μm, the optimal spherical aberration correction amount for the data layer L5 is 50 μm; at this time, the FE-signal amplitude is the largest. Likewise, the plotted curve (b) represents FE-signal amplitudes which are obtained from the data layer L4 while the spherical aberration correction amount for the data layer L4 is changed. Since the distance from the outer cover-layer surface of the optical disc 1 to the data layer L4 is 60 μm (the thickness of the cover layer 100 plus the thickness of the spacer layer 107), the optimal spherical aberration correction amount for the data layer L4 is 60 μm; at this time, the FE-signal amplitude is the largest. Likewise, the plotted curves (c), (d), (e), and (f) represent FE-signal amplitudes which are obtained from the data layers L3, L2, L1, and L0, respectively. The curves (c), (d), (e), and (f) show that their respective FE-signal amplitudes are the largest when the spherical aberration correction amount is 70 μm, 80 μm, 90 μm, and 100 μm, respectively, which amounts are respectively equal to the distances from the outer cover-layer surface of the optical disc 1 to the data layers L3, L2, L1, and L0.

In a conventional method, before the focus of a laser beam is locked onto the target data layer L0, the spherical aberration correction amount is set to 100 μm in advance, which is the optimal value for the data layer L0. This is because, as already shown in FIG. 8, the FE-signal amplitude is the largest at the data layer L0 when the spherical aberration correction amount is 100 μm. Note that the setup information to be set for the spherical aberration correction actuator 610 to achieve the 100-μm spherical aberration correction amount is prestored on the EEPROM inside the optical pickup 4. The above setup information for the spherical aberration correction actuator 610 can be set, for example, at the time of production of the optical pickup 4, by playing a reference disc whose thickness from the disc cover surface to a particular data layer is known to be 100 μm and setting the spherical aberration correction amount that leads to the best playing capabilities.

In the first embodiment, in contrast, the spherical aberration correction amount upon focus lock operation is set to a larger value than in the conventional method and for example to 105 μm. In other words, before the focus lock operation, the control circuit 15 outputs a predetermined signal as the spherical aberration correction signal SAD so that the spherical aberration correction amount becomes 105 μm.

Figure 10:
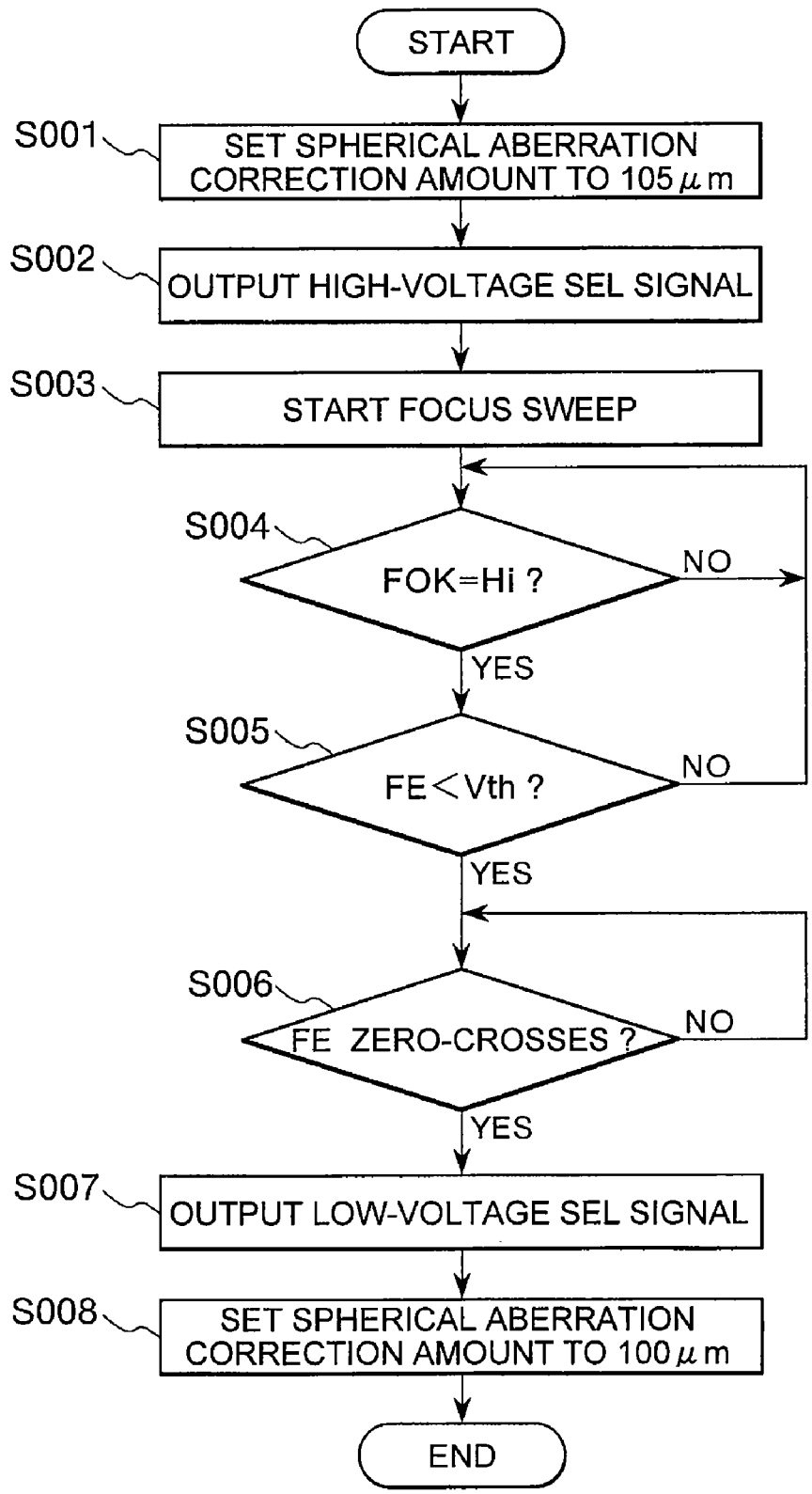
FIG. 10 is a flowchart according to a first embodiment of the method of locking focus.

FIG. 10 shows a flowchart for the focus lock operation according to the first embodiment.

When the focus lock operation starts, the control circuit 15 outputs a predetermined signal as the spherical aberration correction signal SAD to drive the second correction lens 605, thereby setting the spherical aberration correction amount to 105 μm (Step S001). The setup value to be set for the spherical aberration correction actuator 610 to achieve the 105-μm spherical aberration correction amount can be set using the setup information stored on the EEPROM inside the optical pickup 4. This is because the relationship of the spherical aberration correction amount to the setup value for the spherical aberration correction actuator 610 depends on the design of the optical pickup 4. In other words, because the above setup information is intended for setting the spherical aberration correction amount to 100 μm, the setup value to be set for the spherical aberration correction actuator 610 to achieve the 105-μm spherical aberration correction amount can be calculated from the setup information.

Next, the control circuit 15 outputs a high-voltage SEL signal (Step S002). This allows the switch circuit 9 to output a sweep signal supplied from the sweep signal generation unit 8 through the input terminal (b).

The control circuit 15 then instructs the sweep signal generation circuit 8 to start a focus sweep so as to move the objective lens 606 closer to the optical disc 1 (Step S003).

The control circuit 15 thereafter monitors an FOK signal (Step S004). In this step, when the FOK signal is at a low voltage, the control circuit 15 continues to monitor the signal.

When the FOK signal is at a high voltage in Step S004, the control circuit 15 compares an FE-signal level against the detection level Vth (Step S005). When the FE-signal level is greater than the detection level Vth, the process returns to Step S004.

When the FE-signal level is less than the detection level Vth in Step S005, then, the control circuit 15 monitors the FE-signal level for zero-crossing (Step S006). When the FE-signal level does not zero-cross, the control circuit 15 continues the monitoring.

When detecting zero-crossing of the FE-signal level in Step S006, the control circuit 15 outputs a low-voltage SEL signal (Step S007). This SEL signal switches the input terminal of the switch circuit 9 from (b) to (a), thereby allowing the switch circuit 9 to output to the driver circuit 12 a signal supplied from the focus servo circuit 7 through the input terminal (a). This in turn closes the focus servo loop and locks the laser focus onto the target data layer L0.

Further, the control circuit 15 outputs a predetermined signal as the spherical aberration correction signal SAD to drive the second correction lens 605, thereby setting the spherical aberration correction amount to 100 μm (Step S008). As a result, the spherical aberration correction amount becomes optimal for the data layer L0 onto which the laser focus is locked. Thus, data can be written on and read from the optical disc 1 in a favorable manner.

As stated above, the first embodiment is configured such that in Step S006, the focus servo loop is closed when an FE signal zero-crosses; however, this timing may not be exactly when the FE signal zero-crosses. For example, the timing can be when the FE single exceeds a certain smaller value than the zero level. This is because the exact zero-cross timing could be late as the servo-loop closing timing. Thus, the focus servo loop may be closed, for example, when the FE signal exceeds a level that is smaller than the zero level by about 5% of half an amplitude of the FE signal, that is, when the FE signal exceeds a level that is smaller than the zero level by 50 mV if half the amplitude is 1 V.

With reference again to FIG. 9, the advantages of the first embodiment are discussed along with comparison between the cases where the embodiment is applied and not applied.

As the latter case, consider a case where the spherical aberration correction amount upon focus lock operation is set to 100 μm. In this case, since the spherical aberration correction amount is 100 μm, which is the optimal value for the data layer L0, the difference between the FE-signal amplitude curves of the data layers L0 and L1 corresponds to the difference D1 of FIG. 9.

When the first embodiment is applied, on the other hand, the spherical aberration correction amount is set to 105 μm. Thus, the difference between the FE-signal amplitude curves of the data layers L0 and L1 corresponds to the difference D2 of FIG. 9.

When the difference D1 between the FE-signal amplitude curves of the data layers L0 and L1, which is obtained when the first embodiment is not applied, is compared with the difference D2 between the FE-signal amplitude curves of the data layers L0 and L1, which is obtained when the first embodiment is applied, it can be seen that the difference D2 is greater than the difference D1, as is obvious from FIG. 9. The reason is that when the spherical aberration correction amount is changed from 100 μm, which is optimal for the data layer L0, to 105 µm, the FE-signal amplitude at the data layer L1 decreases more than the FE-signal amplitude at the data layer L0.

Now, with reference again to FIGS. 4A and 4B, the difference between the bottom levels B1 and B0 of two S-shaped waveforms of an FE signal is taken into consideration. When the first embodiment is not applied, the bottom level difference between B1 and B0 is equivalent to approximately half the difference D1 of FIG. 9. When the first embodiment is applied, on the other hand, the bottom level difference is equivalent to approximately half the difference D2 of FIG. 9. This means that the application of the first embodiment enables enlargement of the difference between the bottom levels of the two S-shaped FE-signal waveforms. Therefore, the detection level Vth in FIG. 4B can be set so as to be numerically distanced with sufficient margins from the bottom levels B1 and B0 of the two S-shaped waveforms. The use of such a detection level Vth, in turn, allows for accurate detection of an S-shaped waveform at the data layer L0, thereby accurately locking the focus of the laser beam onto the target data layer L0.

The first embodiment thus enlarges the difference between the bottom levels of the two S-shaped FE-signal waveforms, which waveforms are obtained from the data layers L0 and L1, by setting the spherical aberration correction amount larger than the distance from the outer cover-layer surface of the optical disc 1 to the target data layer L0. This allows the optical disc apparatus to accurately detect an S-shaped waveform at the data layer L0, thereby locking the focus of the laser beam accurately and rapidly onto the target data layer L0.

While the spherical aberration correction amount upon the focus lock operation is set to 105 µm in the first embodiment, it is not limited to that value. Because the spherical aberration correction amount is only required to enlarge the difference between the bottom levels of the two S-shaped waveforms of the FE signal at the data layers L0 and L1, it can also be set to such a larger value than 100 µm as 102 µm or 108 µm. However, when the spherical aberration correction amount is set extremely high, for example, to 150 µm, the focus servo gain falls short due to decrease in the FE-signal amplitude at the data layer L0, possibly resulting in focus lock failure. When the first embodiment is to be applied, therefore, it is desired that the upper limit of the spherical aberration correction amount be 130 µm, which is 130% of the distance from the outer cover-layer surface of the optical disc 1 to the target data layer L0.

It should also be noted that although the EEPROM, which stores the spherical aberration correction amount that achieves the best reproducing capabilities of a reference disc, is provided inside the optical pickup 4 in the first embodiment, the EEPROM installation place may not be limited thereto: it only needs to be within the optical disc apparatus. Of course, other types of nonvolatile storage may be used in place of or in addition to the EEPROM.

Second Embodiment

In the first embodiment, the focus of a laser beam is locked onto the data layer L0, the deepest data layer of the optical disc 1. In a second embodiment of the method of locking focus, in contrast, the focus of the laser beam is locked onto the data layer L3, an intermediate data layer.

The configuration of an optical disc apparatus according to the second embodiment is the same as that of the first embodiment shown in FIG. 5.

Figure 11:
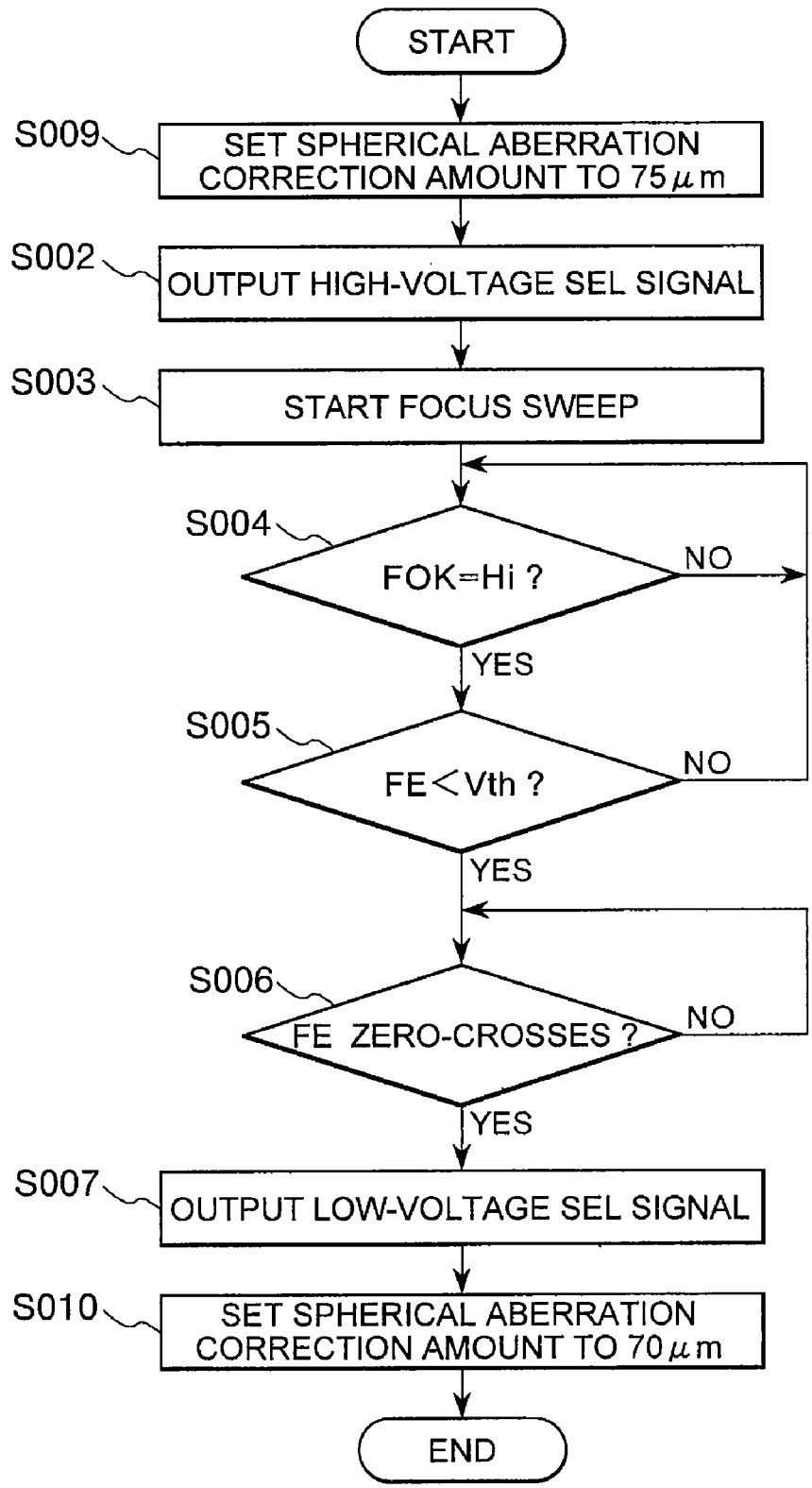
FIG. 11 is a flowchart according to a second embodiment of a method of locking focus.

FIG. 11 shows a flowchart for the focus lock operation according to the second embodiment.

The difference between the flowchart of the first embodiment in FIG. 10 and the flowchart of the second embodiment in FIG. 11 lies in their setup values for the spherical aberration correction amount. Specifically, in the flowchart of the first embodiment, the spherical aberration correction amount is set to 105 µm (Step S001 of FIG. 10) whereas in the flowchart of the second embodiment, it is set to 75 µm (Step S009). Further, after the focus servo loop is closed, the spherical aberration correction amount is set to 70 µm (Step S010). The other steps of the flowchart in FIG. 11 are the same as those in FIG. 10 and are not discussed further.

The effects of the second embodiment are now discussed along with comparison between the cases where the embodiment is applied and not applied.

Figure 12:
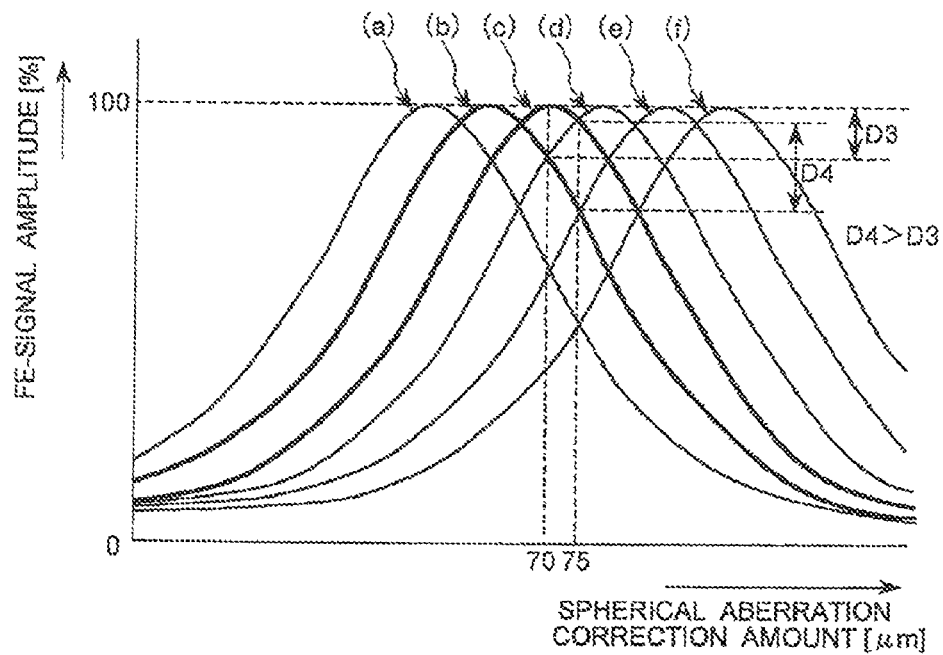
FIG. 12 is a schematic diagram showing the relationship between a spherical aberration correction amount and its associated focus error signal amplitude at each data layer, the diagram being for explaining the second embodiment of the method of locking focus.

Similar to FIG. 9 used for explaining the first embodiment, FIG. 12 shows the relationship in the second embodiment between the spherical aberration correction amount and associated FE-signal amplitude at each data layer.

As the case where the second embodiment is not applied, consider a case where the spherical aberration correction amount upon the focus lock operation is set to 70 µm, which is the optimal value for the target data layer L3. The plotted curve (b) of FIG. 12 represents FE-signal amplitudes at the data layer L4, and the plotted curve (c) represents FE-signal amplitudes at the data layer L3. The difference between the FE-signal amplitude curves of the data layers L4 and L3 thus corresponds to the difference D3 of FIG. 12.

When the second embodiment is applied, on the other hand, the difference between the FE-signal amplitude curves of the data layers L4 and L3 corresponds to the difference D4 of FIG. 12, for the spherical aberration correction amount is set to 75 µm.

When the difference D3 between the FE-signal amplitude curves of the data layers L4 and L3, which is obtained when the second embodiment is not applied, is compared with the difference D4 between the FE-signal amplitude curves of the data layers L4 and L3, which is obtained when the second embodiment is applied, it can be seen that the difference D4 is greater than the difference D3, as is obvious from the FIG. 12. The reason is that when the spherical aberration correction amount is changed from 70 µm, which is optimal for the data layer L3, to 75 µm, the FE-signal amplitude at the data layer L4 decreases more than the FE-signal amplitude at the data layer L3.

Similar to FIGS. 4A and 4B, FIGS. 13A and 13B show FE-signal waveforms that appear at the time of focus lock operation when the second embodiment is applied.

Figure 13A:
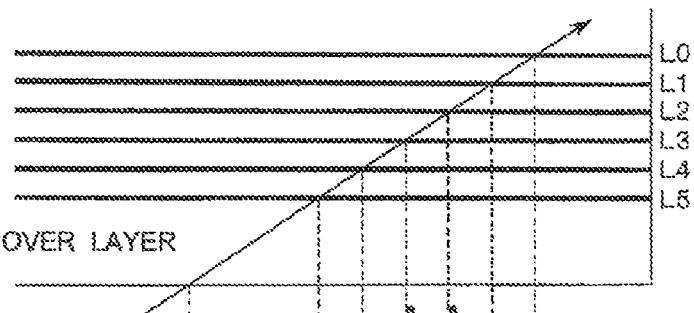
FIGS. 13A and 13B are collectively a waveform diagram for explaining the second embodiment of the method of locking focus.
Figure 13B:
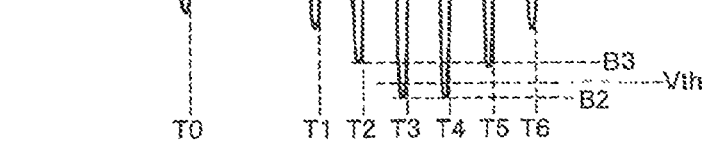

In FIG. 13B, reference symbol B2 denotes the bottom level of the S-shaped FE-signal waveform at the data layer L3, and reference symbol B3 denotes the bottom level of the S-shaped FE-signal waveform at the data layer L4. A detection level Vth is provided between the bottom levels B2 and B3 so as to detect the S-shaped FE-signal waveform that appears when the laser beam travels through the target data layer L3 onto which to lock the focus of the laser beam. Thus, the focus of the laser beam can be locked accurately onto the target data layer L3 by the control circuit 15 closing the focus servo loop when the FE signal zero-crosses after exceeding the detection level Vth.

Here, the difference between the bottom levels B2 and B3 is equivalent to approximately half the FE-signal amplitude difference D4 of FIG. 12. As stated above, the application of the second embodiment increases the FE-signal amplitude difference from the difference D3 to the difference D4 of FIG. 12. Therefore, the detection level Vth in FIG. 13B can be set so as to be numerically distanced with sufficient margins from the bottom levels B3 and B2 of the two S-shaped waveforms.

The use of such a detection level Vth, in turn, allows for accurate detection of an S-shaped waveform at the data layer L3, thereby locking the focus of the laser beam accurately and rapidly onto the target data layer L3.

The second embodiment thus enlarges the difference between the bottom levels of the two S-shaped FE-signal waveforms, which waveforms are obtained from the data layers L3 and L4, by setting the spherical aberration correction amount larger than the distance from the outer cover-layer surface of the optical disc 1 to the target data layer L3. This allows the optical disc apparatus to accurately detect an S-shaped waveform at the data layer L3, thereby locking the focus of the laser beam accurately onto the target data layer L3.

While the spherical aberration correction amount upon the focus lock operation is set to 75 μm in the second embodiment, it is not limited to that value. Because the spherical aberration correction amount is only required to enlarge the difference between the bottom levels of the two S-shaped FE-signal waveforms at the data layers L3 and L4, it can also be set to such a larger value than 70 μm as 72 μm or 78 μm. However, when the spherical aberration correction amount is set extremely high, for example, to 100 μm, the focus servo gain falls short due to decrease in the FE-signal amplitude at the data layer L3, possibly resulting in focus lock failure. When the second embodiment is to be applied, therefore, it is desired that the upper limit of the spherical aberration correction amount be 91 μm, which is 130% of the distance from the outer cover-layer surface of the optical disc 1 to the target data layer L3.

It should also be noted that although in the second embodiment, the data layer L3 is selected as the target data layer onto which to lock the focus, the embodiment is also applicable when an alternative data layer such as the data layer L2 or L4 is selected. In that case, the spherical aberration correction amount just needs to be set larger than the distance from the outer cover-layer surface of the optical disc 1 to the alternative data layer.

Third Embodiment

In both of the foregoing first and second embodiments, the focus lock operation is performed with a so-called up sweep in which the objective lens 606 is swept upward, that is, from the outer surface side of the optical disc 1 toward the target data layer side. In a third embodiment of the method of locking focus, by contrast, the focus lock operation is performed with a so-called down sweep in which the objective lens 606 is swept downward, that is, from the data layer side toward the outer surface side of the optical disc 1. In this embodiment, the data layer L1 is a target data layer onto which to lock the focus of a laser beam.

The configuration of an optical disc apparatus according to the third embodiment is the same as that of the first and second embodiments shown in FIG. 5.

FIGS. 14A and 14B show the focus lock operation according to the third embodiment with the use of a conventional down sweep and its associated signal waveforms. FIGS. 14A and 14B are illustrated in the same manner as FIGS. 4A and 4B, so detailed descriptions thereof are omitted.

It is assumed in FIGS. 14A and 14B that the spherical aberration correction mechanism of the optical disc apparatus is adjusted in advance so that the spherical aberration correction amount is optimal for the data layer L1. Since the distance from the outer cover-layer surface of the optical disc 1 to the data layer L1 is the total layer thickness including the cover layer 100 and the spacer layers 107 up to 110, or 90 μm, the spherical aberration correction amount optimal for the data layer L1 is also 90 μm.

When the control circuit 15 moves the objective lens 606 upward under this condition, the laser beam passes through the outer cover-layer surface and the data layers L5, L4, L3, L2, L1, and L0 at times T0, T1, T2, T3, T4, T5, and T6, respectively, as shown in FIGS. 14A and 14B. The control circuit 15 then moves the objective lens 606 downward at time T7 that comes shortly after time T6. Thereafter, with the downward movement of the objective lens 606, the laser beam travels down through the data layers L0, L1, L2, L3, L4, and L5 at times T8, T9, T10, T11, T12, and T13, respectively.

Every time the laser beam passes through a data layer with the above movements of the objective lens 606, the FE signal exhibits an S-shaped waveform. Since the spherical aberration correction amount is set to 90 μm, which is the optimal value for the target data layer L1, the FE-signal amplitude is larger when the laser beam passes through the data layer L1 at times T5 and T9 than when through any other data layers.

Reference symbol B5 in FIG. 14B denotes the top level of the FE-signal waveform at the data layer L0, and reference symbol B6 denotes the top level of the FE-signal waveform at the data layer L1. In addition, a detection level Vth is provided between the top levels B5 and B6. To lock the focus of the laser beam on the target data layer L1, then, the control circuit 15 needs to detect an increase in FE signal level above the detection level Vth after time T7, at which the movement of the objective lens 606 is switched to the downward movement, and to close the focus servo loop when the FE signal level zero-crosses thereafter.

Here, of importance is whether the detection level Vth can be numerically distanced with sufficient margins from the top levels B5 and B6 of the FE signal. That is, the larger the difference between the top levels B5 and B6, the larger margins the detection level Vth can have, hence the higher reliability of the focus lock operation.

In the third embodiment, thus, the spherical aberration correction amount upon the focus lock operation is set to a smaller value than a conventionally adopted one, for example to 85 μm. That is, the control circuit 15 outputs a predetermined signal as the spherical aberration correction signal SAD such that the spherical aberration correction amount is set to 85 μm before the focus lock operation.

Figure 15:
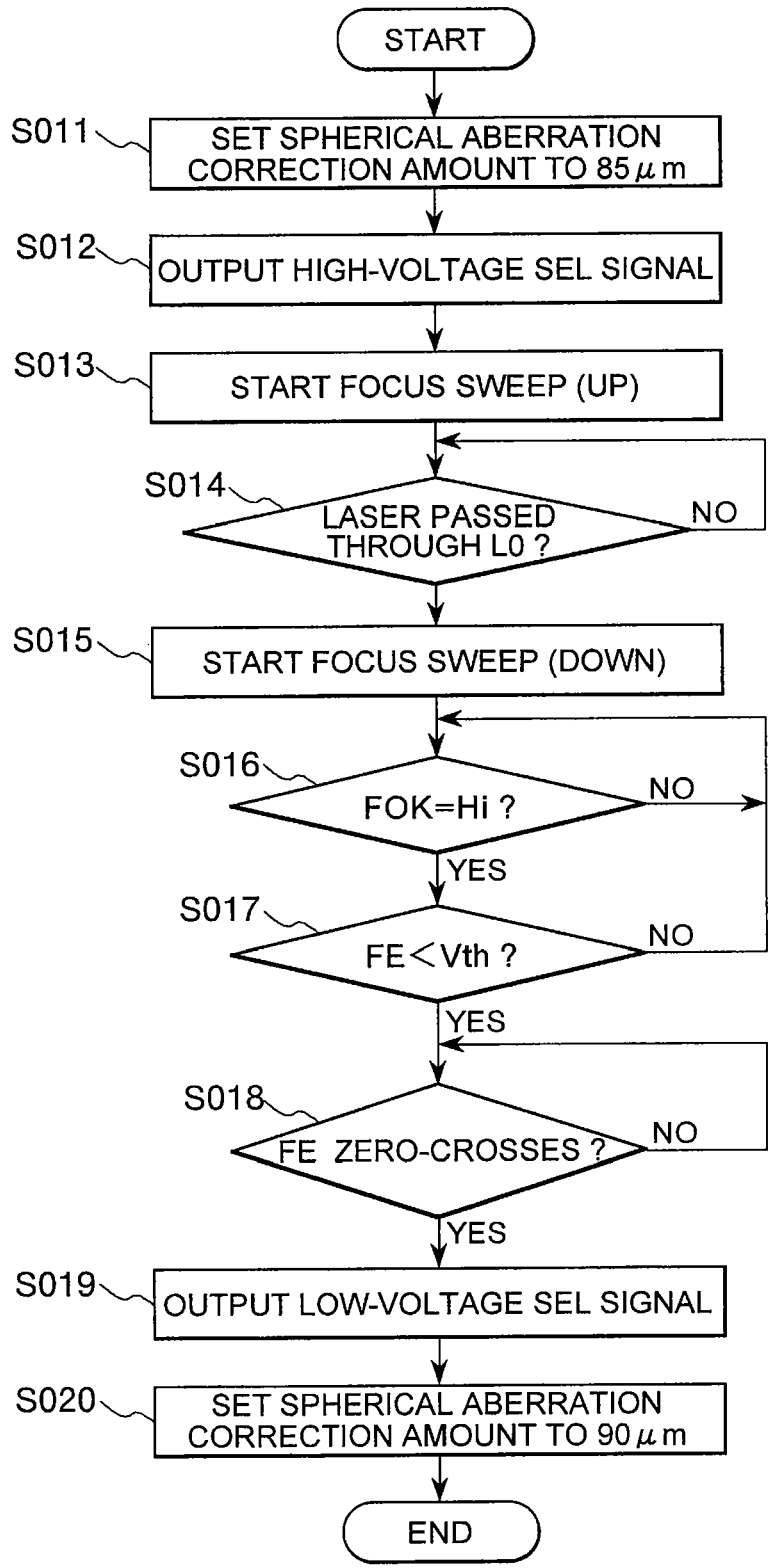
FIG. 15 is a flowchart according to the third embodiment of the method of locking focus.

FIG. 15 is a flowchart for the focus lock operation according to the third embodiment.

When the focus lock operation starts, the control circuit 15 outputs a predetermined signal as the spherical aberration correction signal SAD to drive the second correction lens 605, thereby setting the spherical aberration correction amount to 85 μm (Step S011).

Next, the control circuit 15 outputs a high-voltage SEL signal (Step S012). This allows the switch circuit 9 to output a sweep signal supplied from the sweep signal generation unit 8 through the input terminal (b).

The control circuit 15 then instructs the sweep signal generation circuit 8 to start a focus up sweep so as to move the objective lens 606 closer to the optical disc 1 (Step S013).

Thereafter, the control circuit 15 monitors an FE signal to detect the passage of the laser beam through the data layer L0 (Step S014). This judgment can be made by counting the waveforms of the FE signal, for example. Alternatively, it can be done by measuring the time required for the laser beam to infallibly pass through the data layer L0.

After detecting the passage of the laser beam through the data layer L0 in Step S014, the control circuit 15 instructs the sweep signal generation circuit 8 to start a focus down sweep so as to move the objective lens 606 away from the optical disc 1 (Step S015).

After switching the movement of the objective lens 606 to the focus down sweep in Step S015, the control circuit 15 monitors an FOK signal (Step S016). In this step, when the FOK signal is at a low voltage, the control circuit 15 continues to monitor the signal.

When the FOK signal is at a high voltage in Step S016, the control circuit 15 compares an FE-signal level against the detection level Vth (Step S017). When the FE-signal level is less than the detection level Vth, the process returns to Step S016.

When the FE-signal level is greater than the detection level Vth in Step S017, then, the control circuit 15 monitors the FE-signal level for zero-crossing (Step S018). When the FE-signal level does not zero-cross, the control circuit 15 continues the monitoring.

When detecting zero-crossing of the FE-signal level in Step S018, the control circuit 15 outputs a low-voltage SEL signal (Step S019). This SEL signal switches the input terminal of the switch circuit 9 from (b) to (a), thereby allowing the switch circuit 9 to output to the driver circuit 12 a signal supplied from the focus servo circuit 7 through the input terminal (a). This in turn closes the focus servo loop and locks the laser focus onto the target data layer L1.

Further, the control circuit 15 outputs a predetermined signal as the spherical aberration correction signal SAD to drive the second correction lens 605, thereby setting the spherical aberration correction amount to 90 µm (Step S020). As a result, the spherical aberration correction amount becomes optimal for the data layer L1 onto which the laser focus is locked. Thus, data can be written on and read from the optical disc 1 in a favorable manner.

Figure 16:
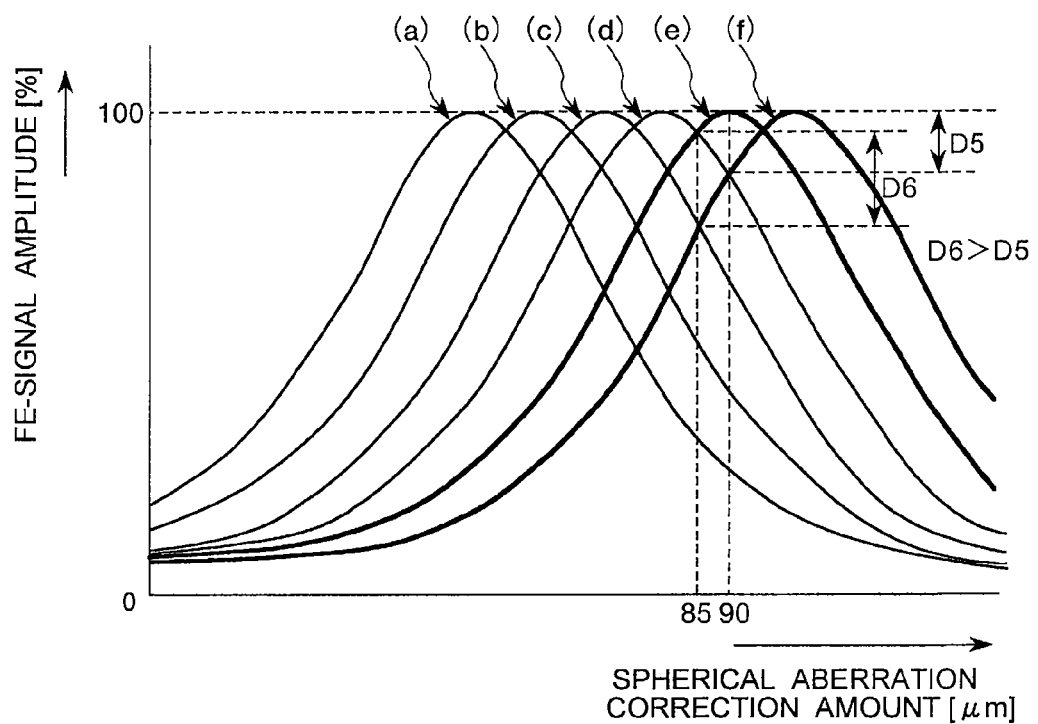
FIG. 16 is a schematic diagram showing the relationship between a spherical aberration correction amount and its associated focus error signal amplitude at each data layer, the diagram being for explaining the third embodiment of the method of locking focus.

With reference now to FIG. 16, the advantages of the third embodiment are discussed along with comparison between the cases where the embodiment is applied and not applied.

FIG. 16 is a graph showing the relationship between the spherical aberration correction amount and its associated FE-signal amplitude for all the data layers from L0 to L5.

As the case where the third embodiment is not applied, consider a case where the spherical aberration correction amount upon the focus lock operation is set to 90 µm. In this case, since the spherical aberration correction amount is 90 µm, which is the optimal value for the data layer L1, the difference between the FE-signal amplitude curves of the data layers L0 and L1 corresponds to the difference D5 of FIG. 16.

When the third embodiment is applied, on the other hand, the difference between the FE-signal amplitude curves of the data layers L0 and L1 corresponds to the difference D6 of FIG. 16, for the spherical aberration correction amount is set to 85 µm.

When the difference D5 between the FE-signal amplitude curves of the data layers L0 and L1, which is obtained when the third embodiment is not applied, is compared with the difference D6 between the FE-signal amplitude curves of the data layers L0 and L1, which is obtained when the third embodiment is applied, it can be seen that the difference D6 is greater than the difference D5, as is obvious from the FIG. 16. The reason is that when the spherical aberration correction amount is changed from 90 µm, which is optimal for the data layer L1, to 85 µm, the FE-signal amplitude at the data layer L0 decreases more than the FE-signal amplitude at the data layer L1.

Now, with reference again to FIG. 14, the difference between the top levels B5 and B6 of two S-shaped FE signal waveforms is taken into consideration. When the third embodiment is not applied, the top level difference between B5 and B6 is equivalent to approximately half the difference D5 of FIG. 16. When the third embodiment is applied, on the other hand, the top level difference is equivalent to approximately half the difference D6 of FIG. 16. This means that the application of the third embodiment enables enlargement of the difference between the top levels of the two S-shaped FE-signal waveforms. Therefore, the detection level Vth in FIG. 14B can be set so as to be numerically distanced with sufficient margins from the top levels B5 and B6 of the two S-shaped waveforms. The use of such a detection level Vth, in turn, allows for accurate detection of an S-shaped waveform at the data layer L1, thereby accurately locking the laser focus onto the target data layer L1.

The third embodiment thus enlarges the difference between the top levels of the two S-shaped FE-signal waveforms, which waveforms are obtained from the data layers L0 and L1, by setting the spherical aberration correction amount smaller than the distance from the outer cover-layer surface of the optical disc 1 to the target data layer L1. This allows the optical disc apparatus to accurately detect an S-shaped waveform at the data layer L1, thereby locking the laser focus accurately and rapidly onto the target data layer L1.

While the spherical aberration correction amount upon the focus lock operation is set to 85 µm in the third embodiment, it is not limited to that value. Because the spherical aberration correction amount is only required to enlarge the difference between the top levels of the two S-shaped FE-signal waveforms at the data layers L0 and L1, it can also be set to such a smaller value than 90 µm as 88 µm or 83 µm. However, when the spherical aberration correction amount is set extremely small, for example, to 50 µm, the focus servo gain falls short due to decrease in the FE-signal amplitude at the data layer L1, possibly resulting in focus lock failure. When the third embodiment is to be applied, therefore, it is desired that the lower limit of the spherical aberration correction amount be 63 µm, which is 70% of the distance from the outer cover-layer surface of the optical disc 1 to the target data layer L1.

It should also be noted that although in the third embodiment, the data layer L1 is selected as the target data layer onto which to lock the laser focus, the embodiment is also applicable when an alternative data layer such as the data layer L2 or L4 is selected. In that case, the spherical aberration correction amount just needs to be set smaller than the distance from the outer cover-layer surface of the optical disc 1 to the alternative data layer.

Fourth Embodiment

In the first to third embodiments, the detection level Vth to detect a particular S-shaped FE-signal waveform can be a fixed value. However, variations of optical pickups and optical discs lead to peak level variations of the S-shaped waveform that appears when a laser beam passes through a target data layer upon focus lock operation. In that case, the S-shaped waveform may not be detected with the detection level Vth, resulting in focus lock failure for the target data layer. To overcome the peak level variations of the S-shaped waveform, it is thus desired that an appropriate detection level Vth be determined and set before the focus lock operation.

A fourth embodiment of the method of locking focus is to explain a setup method of the detection level Vth when, as in the first embodiment, the focus lock operation is performed for the data layer L0.

Note that the configuration of an optical disc apparatus according to the fourth embodiment is the same as that of the first embodiment shown in FIG. 5.

With reference now to the diagrams of FIGS. 17A to 17D and the flowchart of FIG. 18, the setup method of the detection level Vth is explained below.

FIG. 17A is a cross-sectional diagram of a six-layered optical disc, wherein the arrow in the figure schematically shows a laser path formed by subjecting the objective lens to up and down sweep operations. FIG. 17B is a conceptual diagram of an FE signal. FIG. 17C is a conceptual diagram of a setup value for the spherical aberration correction amount, with FIG. 17D being a conceptual diagram of an SEL signal.

Figure 17:
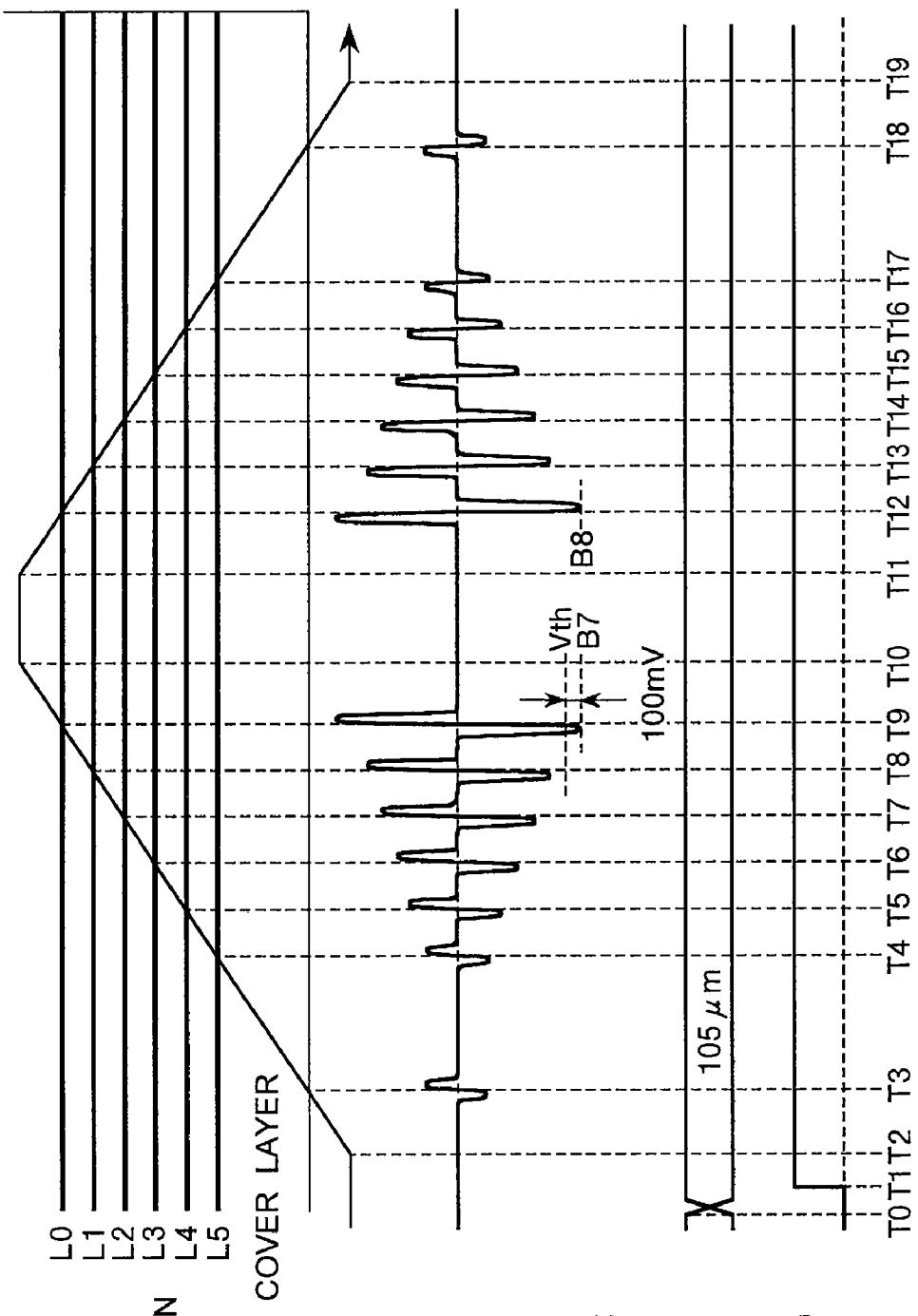
FIGS. 17A, 17B, 17C, and 17D are collectively a waveform diagram for explaining a fourth embodiment of the invention.
Figure 18:
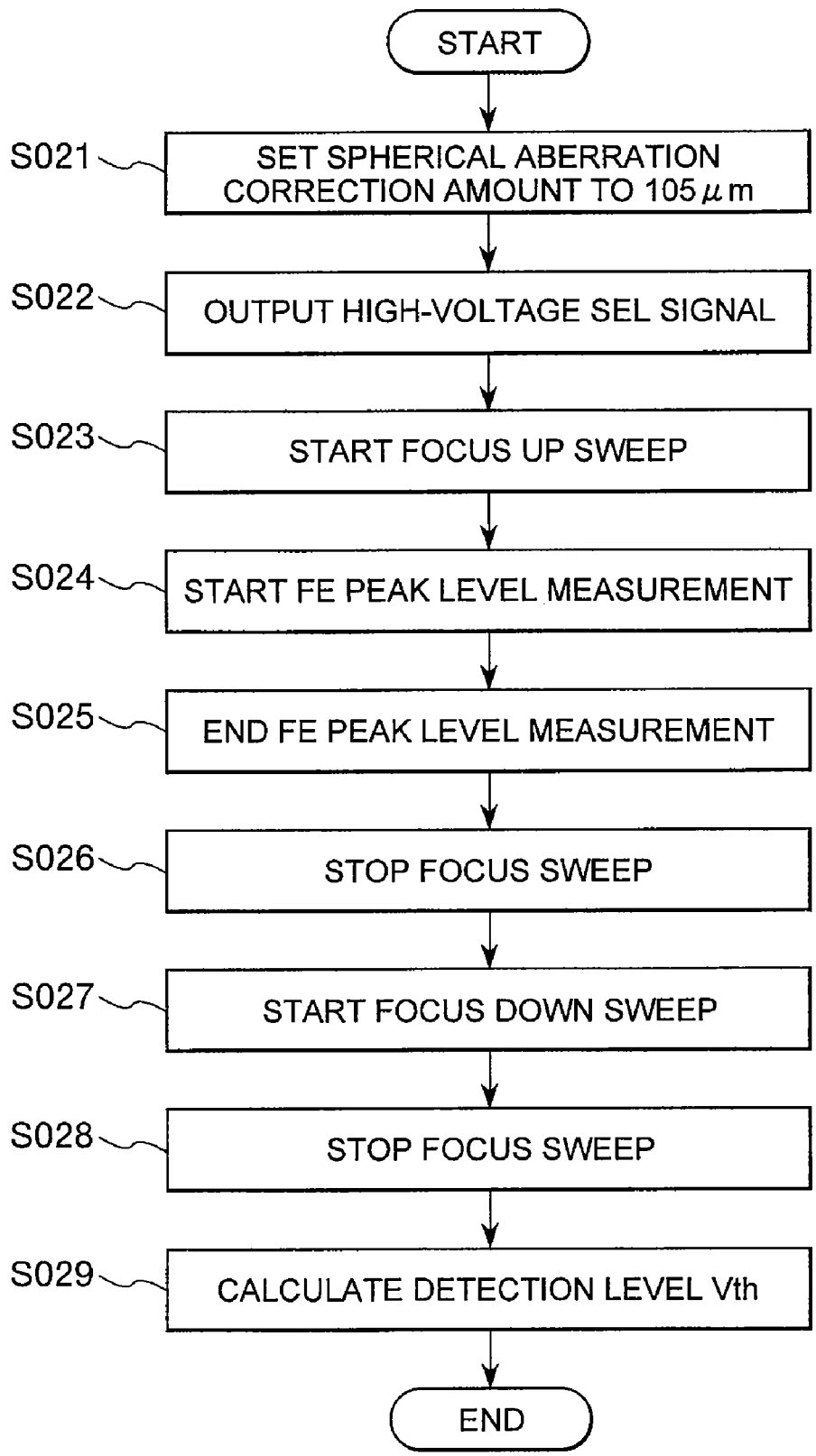
FIG. 18 is a flowchart according to the fourth embodiment of a method of locking focus.

When the setup process of the detection level Vth starts, the control circuit 15 outputs a predetermined signal as the spherical aberration correction signal SAD at time T0 of FIG. 17 to drive the second correction lens 605, thereby setting the spherical aberration correction amount to 105 μm (Step S021 of FIG. 18). The reason the spherical aberration correction amount is set to 105 μm is that the focus lock operation of the first embodiment is performed with the spherical aberration correction amount set to 105 μm and that the detection level Vth is to be determined under this condition.

Next, the control circuit 15 outputs a high-voltage SEL signal at time T1 of FIG. 17 (Step S022 of FIG. 18). This allows the switch circuit 9 to output a sweep signal supplied from the sweep signal generation unit 8 through the input terminal (b).

The control circuit 15 then instructs the sweep signal generation circuit 8 to start a focus up sweep at time T2 of FIG. 17 so as to move the objective lens 606 closer to the optical disc 1 (Step S023 of FIG. 18). By moving the objective lens 606 upward toward the optical disc, the FE signal exhibits the first S-shaped waveform at time T3 of FIG. 17 when the laser beam passes through the outer surface of the cover layer 100. Likewise, by moving the objective lens 606 even closer to the optical disc, the FE signal exhibits S-shaped waveforms at times T4, T5, T6, T7, T8, and T9 when the laser beam passes through the data layers L5, L4, L3, L2, L1, and L0, respectively. Since the spherical aberration correction amount is set to 105 μm, the FE-signal amplitude is the largest when the laser beam passes through the data layer L0, as explained earlier with FIG. 9 of the first embodiment.

After the objective lens 606 starts the sweep operation in Step S023, the control circuit 15 starts to measure a peak level of the FE signal (Step S024 of FIG. 18). In this case, the peak level to be measured is a bottom peal level of the FE signal. As stated above, when the spherical aberration correction amount is set to 105 μm, the FE-signal amplitude at the data layer L0 is the largest of those at the other data layers. Thus, the bottom peak level to be measured is the bottom peak level of the FE-signal waveform at the data layer L0, that is, the bottom peak level B7 of FIG. 17B.

After the laser beam travels through the deepest data layer L0, the control circuit 15 terminates the measurement of the FE-signal peak level at time T10 of FIG. 17 (Step S025 of FIG. 18).

The control circuit 15 then instructs the sweep signal generation circuit 8 to stop the focus sweep (Step S026 of FIG. 18). This step, Step S026, can be performed at the same time as Step S025.

Next, in order to move the objective lens 606 back to its initial position, the control circuit 15 instructs, at time T11 of FIG. 17, the sweep signal generation circuit 8 to start a focus down sweep (Step S027 of FIG. 18). This instruction prompts the objective lens 606 to move downward away from the optical disc 1. By moving the objective lens 606 downward away from the optical disc, the FE signal exhibits an S-shaped waveform at time T12 of FIG. 17 when the laser beam passes through the data layer L0 of the optical disc 1. Likewise, by moving the objective lens 606 further away from the optical disc 1, the FE signal exhibits S-shaped waveforms at times T13, T14, T15, T16, T17, and T18 when the laser beam passes through the data layers L1, L2, L3, L4, L5, and the outer surface of the cover layer 100, respectively. Since the spherical aberration correction amount is set to 105 μm, the FE-signal amplitude is the largest when the laser beam passes through the data layer L0, as already explained for Step S024.

After the laser beam travels through the outer surface of the cover layer 100, the control circuit 15 instructs, at time T19 of FIG. 17, the sweep signal generation circuit 8 to stop the focus sweep operation (Step S028 of FIG. 18).

Finally, the control circuit 15 calculates the detection level Vth with the use of the bottom peak level measured during the time period between Steps S024 and S025, or the bottom level B7 of FIG. 17B (Step S029 of FIG. 18). The calculation method of the detection level Vth may be such that when the measured bottom peak level B7 is, for example, −800 mV, the detection level Vth is set to −700 mV, which is closer to the zero level by a predetermined level of 100 mV.

In the above-described setup method of the detection level Vth, the detection level Vth is obtained by measuring the FE signal during the up sweep operation of the objective lens 606. To increase measurement accuracy, however, the FE signal can also be measured during the down sweep operation of the objective lens 606 to detect another bottom peak level, that is, the bottom peak level B8 of FIG. 17. This bottom peak level B8 can be used to calculate the average of the bottom peak levels B7 and B8, and the average can be set as the detection level Vth.

It should also be noted that although in the fourth embodiment, the data layer L0 is selected as the target data layer onto which to lock the focus, the embodiment is also applicable when an alternative data layer such as the data layer L3 is selected as in the second embodiment. In that case, the spherical aberration correction amount just needs to be set to 75 μm in Step S021.

Also, in the above explanation, the predetermined level, which is used to calculate the detection level Vth, is assumed to be 100 mV. However, when the predetermined level is set to too large a value, the S-shaped FE-signal waveform at the data layer L1 may be misdetected as the one to be detected from the data layer L0 by the calculated detection level Vth. Thus, it is desired that the predetermined level be obtained through experiments.

Further, as an alternative setup method of the detection level Vth, 95% of a measured peak level can be set as the detection level Vth.

Furthermore, the calculation of the detection level Vth only needs to be performed once during disc loading. That is, when, for example, focus servo control becomes off due to disturbances such as externally generated vibration or the like during steady data write or read operation, the already calculated value during disc loading can be used as the detection level Vth.

In the foregoing fourth embodiment of the method of locking focus, the peak level of the S-shaped FE-signal waveform at the target data layer L0 is measured with the spherical aberration correction amount set to the same amount as the one used during the focus lock operation of the first embodiment, and the S-shaped waveform detection level Vth is calculated with the use of the measured peak level. Thus, an appropriate detection level Vth can be set so as to overcome the problem of variations of S-shaped FE-signal waveforms, which is attributable to variations of optical pickups and optical discs. Accordingly, the reliability of the focus lock operation can be improved.

Fifth Embodiment

In the foregoing fourth embodiment, the setup method of the detection level Vth when the focus lock operation is performed for the data layer L0 has been explained. In this fifth embodiment of the method of locking focus, an alternative setup method of the detection level Vth is discussed.

As stated earlier, the six-layered optical disc for which the foregoing first to fourth embodiments are intended by way of example has the structure of FIG. 1, and each spacer layer provided between two data layers is 10 μm thick. However, it is probable that the thickness of each spacer layer is required to be reduced, for example, to 8 μm for the purpose of improving the data reproducing capabilities of the optical disc.

It is also probable that the number of data layers is required to be increased, for example, to eight. This is, for example, the case where the six-layered optical disc of FIG. 1 has extra data layers L6 and L7 located down from the data layer L5. In that case, too, the thickness of each spacer layer may be reduced to a smaller value than 10 μm of FIG. 1.

When the spacer layer between the data layers L0 and L1 is smaller in thickness as in the above cases, the peak level difference between the S-shaped FE-signal waveform that appears at the data layer L0 and the one that appears at the data layer L1 becomes smaller than in a conventional optical disc. Thus, when the setup method of the detection level Vth according to the fourth embodiment is to be employed, the method using a measured FE-signal peak level and a fixed value, this fixed value needs to be decreased. However, this makes the method vulnerable to the influences of variation in FE-signal peak level.

Thus, an alternative setup method of the detection level Vth according to the fifth embodiment is explained below to overcome the above problem.

Note that the configuration of an optical disc apparatus according to the fifth embodiment is the same as that of the first embodiment shown in FIG. 5.

The alternative setup method of the detection level Vth is explained with reference to the diagrams of FIGS. 19A to 19D and the flowchart of FIG. 20. Each of the diagrams of FIGS. 19A to 19D is the same as those of FIGS. 17A to 17D of the fourth embodiment and is not discussed further in detail.

Figure 20:
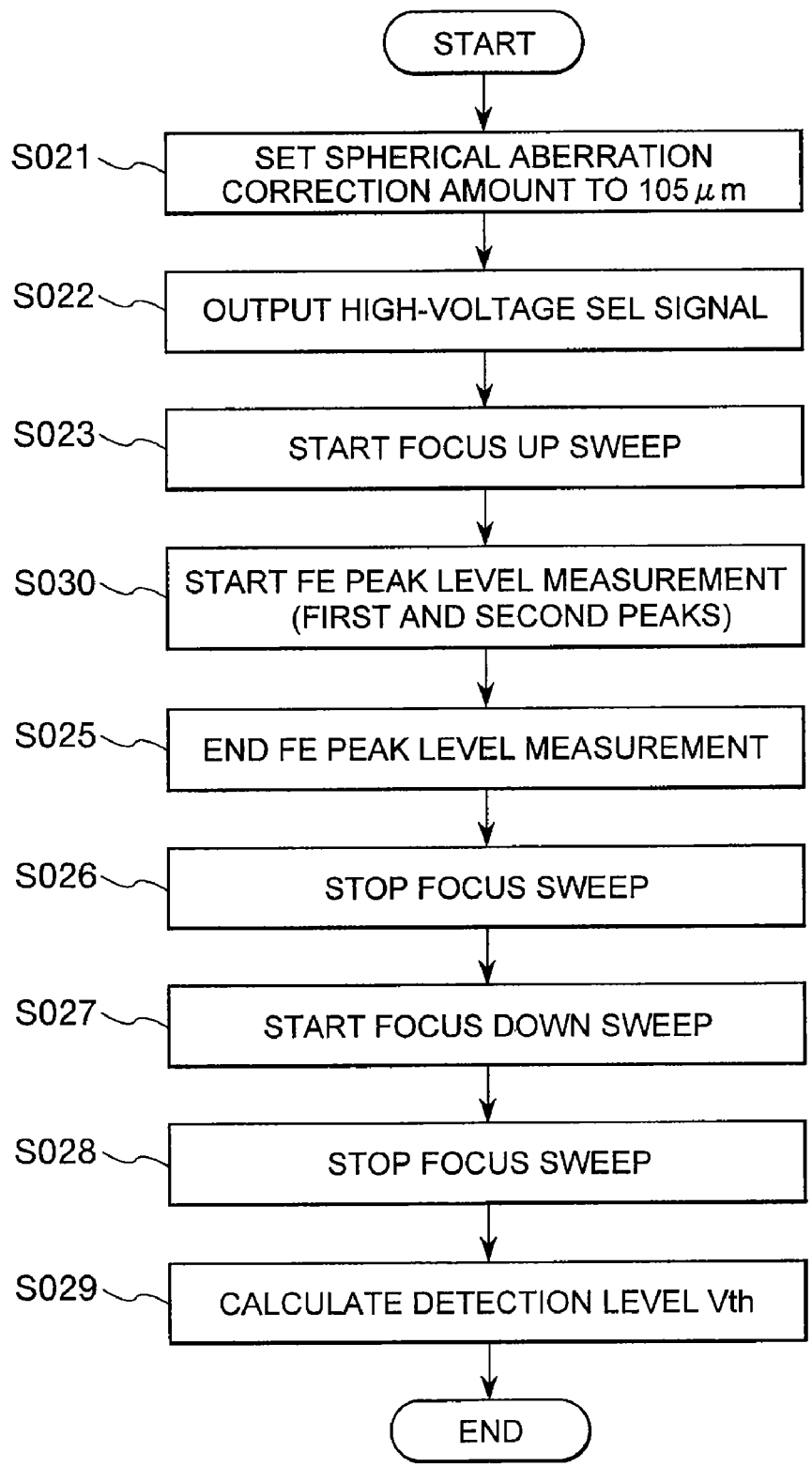
FIG. 20 is a flowchart according to the fifth embodiment of the method of locking focus.

The flowchart of the fifth embodiment in FIG. 20 differs from the flowchart of the fourth embodiment in FIG. 18 in that the former flowchart does not include Step S024 of FIG. 18 but instead include Step S030. In addition, the calculation method of the detection level Vth in Step S029 of the fifth embodiment is different from that of fourth embodiment.

The setup method of the detection level Vth is described below.

Similar to the fourth embodiment, the control circuit 15 moves the objective lens 606 upward by performing Steps S021 up to S023.

After the objective lens 606 starts the up sweep operation in Step S023, the control circuit 15 measures a first peak level, the lowest level, and a second peak level, the second lowest level, of an FE signal (Step S030). Because the spherical aberration correction amount is set to 105 μm in Step S021, the FE-signal amplitude at the data layer L0 is the largest of those at the other data layers, as explained with FIG. 9. Further, as is obvious from FIG. 9, the FE-signal amplitude at the data layer L1 is the second largest. Thus, the first and second peak levels to be measured are the bottom peak levels B7 and B9, respectively, of FIG. 19B.

Figure 19:
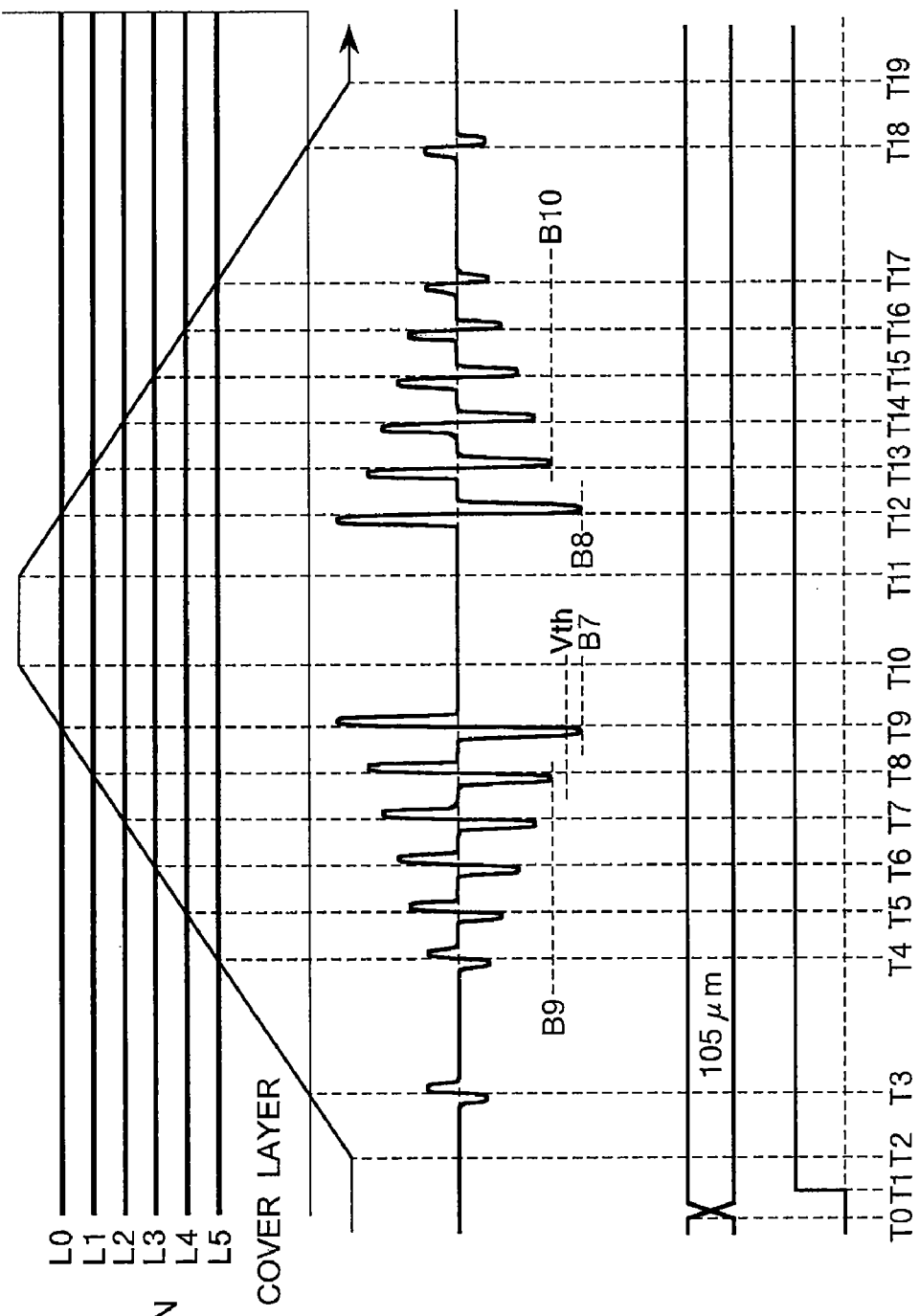
FIGS. 19A, 19B, 19C, and 19D are collectively a waveform diagram for explaining a fifth embodiment of a method of locking focus.

After the laser beam travels through the deepest data layer L0, the control circuit 15 terminates the measurement of the FE-signal peak levels at time T10 of FIG. 19 (Step S025 of FIG. 20).

Similar to the fourth embodiment, the control circuit 15 then moves the objective lens 606 back to its initial position by performing Steps S026 up to S028.

Thereafter, the control circuit 15 calculates the detection level Vth with the use of the measured first and second peak levels B7 and B9 (Step S029). To lock the laser focus onto the data layer L0, the detection level Vth needs to be between the first and second peak levels B7 and B9; if so, the S-shaped FE-signal waveform at the data layer L0 can be accurately detected. Thus, the detection level Vth can be, for example, the median between the first and second peak levels B7 and B9.

In the above-described setup method of the detection level Vth, the first and second peak levels B7 and B9 are obtained by measuring the FE signal during the up sweep operation of the objective lens 606. To increase measurement accuracy, however, the FE signal can also be measured during the down sweep operation of the objective lens 606 to detect extra bottom peak levels, that is, the bottom peak level B8 at the data layer L0 and the bottom peak level B10 at the data layer L1, which are shown in FIG. 19B. These peak levels can also be used to calculate the detection level Vth. Specifically, the detection level Vth can be the median between the average of the peak levels B7 and B8 at the data layer L0 and the average of the peak levels B9 and B10 at the data layer L1.

It should also be noted that although in the fifth embodiment, the data layer L0 is selected as the target data layer onto which to lock the focus, the embodiment is also applicable when an alternative data layer such as the data layer L3 is selected as in the second embodiment. In that case, the spherical aberration correction amount just needs to be set to 75 μm in Step S021.

Further, the calculation of the detection level Vth only needs to be performed once during disc loading. That is, when, for example, focus servo control becomes off due to disturbances such as externally generated vibration or the like during steady data write or read operation, the already calculated value during disc loading can be used as the detection level Vth.

The foregoing fifth embodiment of the method of locking focus is designed to measure the first peak level of the S-shaped FE-signal waveform at a target data layer and the second peak level of the S-shaped FE-signal waveform at a layer adjacent to the target data layer with the spherical aberration correction amount set to the same amount as the one used during the focus lock operation of the first embodiment, thereby calculating the S-shaped waveform detection level Vth with the use of the two peak levels measured. Thus, an appropriate detection level Vth can be set even if the peak level differences among S-shaped FE-signal waveforms become small due to decrease in interlayer distance. Accordingly, the reliability of the focus lock operation can be improved.

As described, the first to third embodiments are designed to perform the focus lock operation after setting the spherical aberration correction amount to a different value than the optimal value for a target data layer. Compared with a conventional case, the use of this method decreases the ratio of the S-shaped FE-signal waveform amplitude at the data layer adjacent to the target data layer through which a laser beam passes earlier than through the target data layer to the S-shaped FE-signal waveform amplitude at the target data layer. This is synonymous with a decreased ratio of a peak level of the S-shaped waveform at the adjacent data layer to a peak level of the S-shaped waveform at the target data layer. Therefore, the detection level to detect the S-shaped FE-signal waveform at the target data layer can be set so as to be numerically distanced with sufficient margins from the peak levels of the two S-shaped waveforms, thereby accurately locking the laser focus onto the target data layer.

The fourth and fifth embodiments are designed to determine, before the focus lock operation, the detection level used to detect the S-shaped FE-signal waveform at the target data layer. This allows for an appropriate setup of the detection level without being influenced by variation in S-shaped waveform peak level and by interlayer distances.

When an optical disc is loaded into an optical disc apparatus, spherical aberration correction adjustment may follow the focus lock operation. One of the adjustment methods is, for example, to change the spherical aberration correction amount in a stepwise manner within a given range and measure the amplitude of a TE signal during each step, thereby obtaining the spherical aberration correction amount that generates the greatest amplitude. In this case, the spherical aberration correction adjustment may be performed immediately after the focus lock operation if the above given range is ±4 μm, for example. That is, Step S008 in the flowchart of the first embodiment (FIG. 10), in which the spherical aberration correction amount is set to 100 μm, may be skipped, thus ending the focus lock operation after Step S007. In the subsequent spherical aberration correction adjustment, TE-signal amplitudes are measured with the spherical aberration correction amount changed in a stepwise manner from 104 μm to 96 μm. This reduces the time during which the spherical aberration correction mechanism is driven, also reducing the loading time.

While various focus lock operations for the six-layered optical disc shown in FIG. 1 have been described in connection with the preferred embodiments of the method of locking focus, they are not intended to be limited to the six-layered optical disc. On the contrary, the focus lock operations according to the invention are applicable to any optical disc as long as it has two or more data layers.

When the present techniques are applied to an optical disc apparatus, the selection of which embodiment to employ among the first to fifth embodiments may be based on the number of data layers. For instance, when an optical disc loaded into the optical disc apparatus is judged to be a BD and the number of data layers is less than three, a conventional focus lock operation may be performed. When the number of data layers is equal to or greater than three, on the other hand, one of the focus lock operations of discussed herein may be performed. Although the reference number in the above example is three, a focus lock operation can also be selected with the reference number being other than three, such as one or four.

While the configuration of the spherical aberration correction mechanism is such as the one shown in FIG. 6, it is not limited thereto; the spherical aberration correction mechanism may also include liquid crystal elements or the like.

Figure 7:
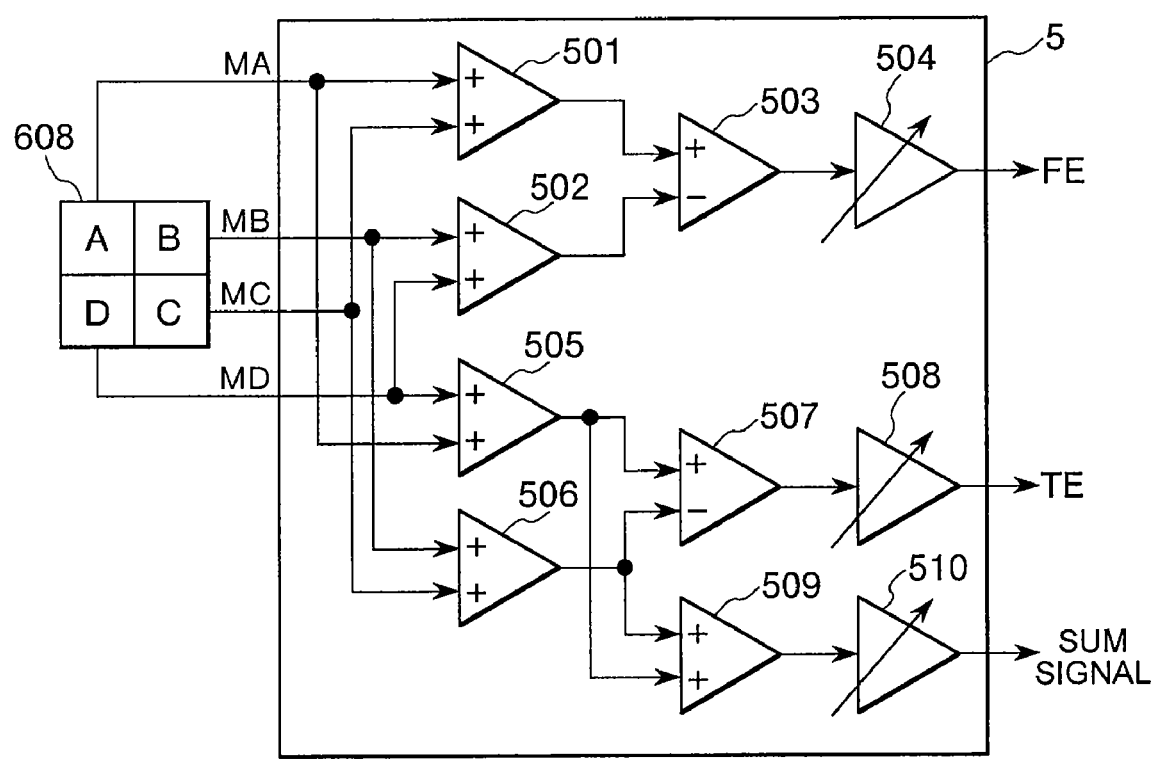
FIG. 7 is a schematic diagram of a signal processing circuit that is included in the optical disc apparatus.

Further, while the optical system and the servo error signal generation method according to the present teachings are as shown in FIGS. 6 and 7, respectively, the servo error signal generation method is not limited thereto. Alternatively, for example, a known knife-edge method may also be used as the FE-signal generation method, and a known DPD method as the TE-signal generation method.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for locking the focus of a laser beam of an optical disc apparatus onto a target data layer of an optical disc having a plurality of data layers,
wherein a peak level ratio is defined as the ratio of a second peak level to a first peak level, the second peak level being a peak level of an S-shaped focus error signal waveform for a data layer adjacent to the target data layer through which the laser beam passes earlier than through the target data layer during focus lock operation, the first peak level being a peak level of an S-shaped focus error signal waveform for the target data layer,
the method comprising steps of:
setting a spherical aberration correction amount to a second spherical aberration correction amount so that the peak level ratio is smaller than that when the spherical aberration correction amount is set to a first spherical aberration correction amount that is optimal for the target data layer;
driving an objective lens in an optical-axis direction of the laser beam; and
closing a focus servo loop after a focus error signal obtained when the laser beam approaches the target data layer exceeds a predetermined level.

2. The method defined in claim 1, further comprising:
setting a detection level that detects the first peak level but not the second peak level when the objective lens is driven; and
wherein the closing the focus servo loop after the focus error signal obtained when the laser beam approaches the target data layer exceeds the predetermined level occurs after exceeding of the detection level.

3. The method defined in claim 1, further comprising:
setting the spherical aberration correction amount to the first spherical aberration correction amount after the focus servo loop is closed such that the spherical aberration correction amount is optimal for the target data layer.

4. The method defined in claim 1, wherein the first spherical aberration correction amount is stored in nonvolatile storage.

5. The method defined in claim 2, wherein:
when the spherical aberration correction amount is set to the second spherical aberration correction amount, the setting of the detection level comprises:
driving the objective lens in the optical-axis direction of the laser beam;
measuring a maximum peak level, the maximum peak level being the largest of all the peak levels of S-shaped focus error signal waveforms obtained from the plurality of data layers, the peak levels being of the given polarity; and
subtracting the predetermined level from the maximum peak level to set the resultant level as the detection level.

6. The method defined in claim 2, wherein:
when the spherical aberration correction amount is set to the second spherical aberration correction amount, the setting of the detection level comprises:
driving the objective lens in the optical-axis direction of the laser beam;
measuring a first peak level, the first peak level being the largest of all the peak levels of S-shaped focus error signal waveforms, and measuring a second peak level, the second peak level being the second largest; and
setting a level between the first and second peak levels as the detection level.

7. An optical disc apparatus for reproducing information from an optical disc having a plurality of data layers; the apparatus comprising:
- a laser light source for emitting a laser light;
- an objective lens for converging the laser light emitted from the laser light source;
- an actuator for driving the objective lens;
- a detector for detecting reflected light from the optical disc;
- a signal processing circuit for generating a focus error signal from the reflected light detected by the detector;
- a spherical aberration correction mechanism which corrects the spherical aberration of the laser light emitted from the laser light source; and
- a control circuit which controls the spherical aberration correction mechanism,
- wherein during a focus locking operation for the laser light with the objective lens onto a target data layer of the optical disc, the control circuit controls the spherical aberration correction mechanism in such a way as to make the difference between the amplitude of the focus error signal obtained from the target data layer and the amplitude of the focus error signal obtained from a data layer adjacent to the target data layer through which the laser light passes earlier than through the target data layer larger than said difference would be when information is reproduced from the target data layer.

8. The optical disc apparatus defined in claim 7, wherein after the focus of the laser light is locked onto the target data layer, the controller controls the spherical aberration correction mechanism in such a way as to decrease the difference between the amplitude of the focus error signal obtained from the target data layer and the amplitude of the focus error signal obtained from the adjacent data layer.

9. The optical disc apparatus defined in claim 7, further comprising:
- a memory for storing a correction amount used for the spherical aberration correction mechanism,
- wherein during the focus locking operation for the laser light onto the target data layer, the control circuit controls the spherical aberration correction mechanism with the use of the correction amount stored on the memory in such a way as to make larger the difference between the amplitude of the focus error signal obtained from the target data layer and the amplitude of the focus error signal obtained from the adjacent data layer said difference would be when information is reproduced from the target data layer.

10. The optical disc apparatus defined in claim 7, wherein during the focus locking operation for the laser light onto the target data layer, the controller changes the correction amount used for the spherical aberration correction mechanism in accordance with a drive direction of the actuator.

* * * * *